United States Patent
McCullough et al.

(10) Patent No.: US 10,959,575 B2
(45) Date of Patent: Mar. 30, 2021

(54) APPARATUS AND METHOD FOR ROASTING COFFEE BEANS

(71) Applicant: JACOBSEN INNOVATIONS, INC., Salt Lake City, UT (US)

(72) Inventors: John McCullough, Salt Lake City, UT (US); Wayco Scroggin, Sandy, UT (US)

(*) Notice: Subject to any disclaimer, the term of this patent is extended or adjusted under 35 U.S.C. 154(b) by 222 days.

(21) Appl. No.: 16/205,653

(22) Filed: Nov. 30, 2018

(65) Prior Publication Data
US 2019/0133377 A1  May 9, 2019

Related U.S. Application Data

(63) Continuation-in-part of application No. 15/180,780, filed on Jun. 13, 2016, now Pat. No. 10,412,988.
(Continued)

(51) Int. Cl.
*H05B 6/78* (2006.01)
*A47J 42/52* (2006.01)
(Continued)

(52) U.S. Cl.
CPC .......... *A47J 42/52* (2013.01); *A23F 5/04* (2013.01); *A23L 5/34* (2016.08); *A23N 12/083* (2013.01);
(Continued)

(58) Field of Classification Search
CPC ...... A23N 12/08; A23N 12/083; A23N 12/10; A23N 12/125; A47J 42/50; A47J 42/52;
(Continued)

(56) References Cited

U.S. PATENT DOCUMENTS 2,602,134 A   10/1947   Nelson
2,922,355 A    2/1958   Green
(Continued)

FOREIGN PATENT DOCUMENTS

EP   2729024    9/2015
EP   2953425   12/2015
(Continued)

OTHER PUBLICATIONS

Wikipedia, "Popcorn", Wikipedia, the free encyclopedia, Mar. 18, 2013 (was known prior to Mar. 11, 2013), en.wikipedia.org/wiki/Popcorn.
(Continued)

*Primary Examiner* — Hung D Nguyen
(74) *Attorney, Agent, or Firm* — Morriss O'Bryant Compagni Cannon, PLLC

(57) ABSTRACT

An apparatus for roasting coffee beans comprises a roasting chamber for containing coffee beans. The roasting chamber is positioned within a resonant cavity of a waveguide. A microwave emitter produces microwave energy within the waveguide with one or more stable high intensity microwave regions within the roasting chamber to heat the coffee beans in the roasting chamber to a temperature sufficient to roast the coffee beans. A device configured to move the coffee beans within the one or more high intensity microwave regions is coupled to the roasting chamber.

20 Claims, 15 Drawing Sheets

Related U.S. Application Data which is a continuation-in-part of application No. 13/794,519, filed on Mar. 11, 2013.

(51) Int. Cl.
| | |
|---|---|
| *A47J 42/50* | (2006.01) |
| *A23N 12/12* | (2006.01) |
| *A23L 5/30* | (2016.01) |
| *A23F 5/04* | (2006.01) |
| *A23N 12/08* | (2006.01) |
| *A23N 12/10* | (2006.01) |
| *H05B 6/74* | (2006.01) |

(52) U.S. Cl.
CPC ........... *A23N 12/10* (2013.01); *A23N 12/125* (2013.01); *A47J 42/50* (2013.01)

(58) Field of Classification Search
CPC ........... A23L 5/34; H05B 6/70; H05B 6/6411; H05B 6/6455; H05B 6/6473; H05B 6/6476; H05B 6/6491; H05B 6/6494; H05B 6/6402; H05B 6/707; H05B 6/78; H05B 6/782; H05B 6/788; H05B 6/80; H05B 6/806; A23F 5/04
USPC ....... 219/690, 693, 706, 751, 752, 753, 756; 99/323.4, 323.5, 323.6, 323.7, 323.8, 99/323.9, 323.11
See application file for complete search history.

(56) References Cited

U.S. PATENT DOCUMENTS

| | | | |
|---|---|---|---|
| 3,492,454 | A | 1/1970 | Smith |
| 4,072,091 | A | 2/1978 | Richardson |
| 4,120,236 | A | 10/1978 | Blomberg |
| 4,156,806 | A | 5/1979 | Teich et al. |
| 4,158,760 | A | 6/1979 | Bowen et al. |
| 4,166,208 | A | 8/1979 | Martel et al. |
| 4,178,843 | A | 12/1979 | Crabtree et al. |
| D256,019 | S | 7/1980 | Boldt et al. |
| 4,326,114 | A | 4/1982 | Gerling et al. |
| 4,458,126 | A | 7/1984 | Dills et al. |
| 4,702,158 | A | 10/1987 | Ishihara |
| 4,780,586 | A * | 10/1988 | Le Viet ............... A23F 5/04 219/752 |
| 4,908,486 | A | 3/1990 | Fry |
| 4,980,529 | A | 12/1990 | Bolton |
| 5,020,688 | A | 6/1991 | Power |
| 5,033,363 | A | 7/1991 | King et al. |
| 5,035,173 | A | 7/1991 | Stein et al. |
| 5,045,659 | A | 9/1991 | Wolfe et al. |
| 5,142,114 | A | 8/1992 | Briggs et al. |
| 5,254,823 | A | 10/1993 | McKee et al. |
| 5,269,072 | A | 12/1993 | Waligorski |
| 5,298,707 | A | 3/1994 | Sprecher et al. |
| 5,438,183 | A | 8/1995 | Hayami et al. |
| 5,501,139 | A | 3/1996 | Lee |
| 5,589,093 | A | 12/1996 | Chen |
| 5,609,097 | A | 3/1997 | Newnan |
| 5,742,033 | A | 4/1998 | Park |
| 5,771,778 | A | 6/1998 | MacLean, IV |
| 5,869,817 | A | 2/1999 | Zietlow et al. |
| 5,902,510 | A * | 5/1999 | Balbaa ............... H05B 6/78 219/752 |
| 6,011,249 | A | 1/2000 | Chung |
| 6,095,032 | A | 8/2000 | Barnett et al. |
| 6,131,386 | A | 10/2000 | Trumble |
| 6,187,353 | B1 | 2/2001 | Wyman et al. |
| 6,268,596 | B1 | 7/2001 | Lauf et al. |
| 6,436,457 | B1 | 8/2002 | Poss |
| 7,109,448 | B2 | 9/2006 | Goranson |
| 7,235,764 | B2 | 6/2007 | Poss |
| 7,908,901 | B2 | 3/2011 | Kyle et al. |
| 8,759,727 | B2 * | 6/2014 | Gard ................... H05B 6/6491 219/689 |
| 8,847,131 | B2 | 9/2014 | Fang |
| 8,993,946 | B2 | 3/2015 | Jacobsen et al. |
| 9,179,696 | B2 | 11/2015 | Jacobsen et al. |
| 9,179,697 | B2 | 11/2015 | Jacobsen et al. |
| 9,215,884 | B2 | 12/2015 | Jacobsen et al. |
| 2003/0127445 | A1 | 7/2003 | Poss |
| 2003/0180419 | A1 | 9/2003 | Calderone |
| 2004/0031790 | A1 | 2/2004 | Kim |
| 2005/0133498 | A1 | 6/2005 | Collins et al. |
| 2005/0134469 | A1 | 6/2005 | Odorcic et al. |
| 2005/0238767 | A1 | 10/2005 | Poss |
| 2006/0191918 | A1 | 8/2006 | Ashford et al. |
| 2006/0288876 | A1 | 12/2006 | Berger et al. |
| 2008/0166457 | A1 | 7/2008 | Gorman |
| 2011/0076372 | A1 | 3/2011 | Cretors |
| 2011/0088562 | A1 | 4/2011 | Korin |
| 2011/0139773 | A1 | 6/2011 | Fagrell et al. |
| 2011/0274804 | A1 | 11/2011 | Barrows et al. |
| 2014/0008357 | A1 | 1/2014 | Cheng et al. |
| 2014/0255568 | A1 | 9/2014 | Jacobsen et al. |
| 2014/0255569 | A1 | 9/2014 | Jacobsen et al. |
| 2015/0351164 | A1 | 12/2015 | Wesson et al. |
| 2016/0043455 | A1 | 2/2016 | Seler et al. |

FOREIGN PATENT DOCUMENTS

| | | |
|---|---|---|
| JP | 56078558 | 6/1981 |
| JP | S6274240 | 4/1987 |
| JP | 63003773 | 4/1988 |
| JP | 63181949 | 7/1988 |
| JP | 402013723 | 1/1990 |
| JP | 02171143 | 7/1990 |
| JP | 04360646 | 12/1992 |
| JP | 2005065532 | 3/2005 |
| JP | 2005137303 | 6/2005 |
| JP | 2006234332 | 9/2006 |
| JP | 2012090616 | 5/2012 |
| KR | 20150146191 | 12/2015 |

OTHER PUBLICATIONS

D. Kybartas, E. Ibenskis et al.: "Single Mode Circular Waveguide Applicator for Microwave Heating of Oblong Objects in Food Research;" Electronics and Electrical Engineering, 2011. No. 8 (114) p. 79-82, Kaunas, Lithuania.

Dibben, Christopher David, "Numerical and Experimental Modelling of Microwave Applicators;" Dissertation submitted to the University of Cambridge for the Degree of Doctor of Philosophy, Jun. 1995, University of Cambridge, Darwin College.

Fliflet, Arne W. et al., "Design and Initial Operation of a 6 k W 2.45 GHz Single-Mode Microwave Cavity Furnace," Naval Research Laboratory NRL/MR/6793--95-7745; Sep. 1, 1995, United States Navy, Washington, D.C.

"Microwave Chemistry: How it all Works," GEM Tomorrow's Science Today, CEM Corporation, 2011 http://www.cem.com/page130.html.

Metaxas, A.C. et al. "Microwave Heating" Based on an article first published in the IEE Power Engineering Journal 5(5) in Sep. 1991.

Akarapu, R. et al. "Integrated Modeling of Microwave Food Processing and Comparison with Experimental Measurements," Journal of Microwave Power & Electromagnetic Energy, vol. 39, No. 3 & 4, p. 171-184, 2004; School of Mechanical and Materials Engineering, Department of Bioengineering Systems, Washington State University, Pullman WA.

Gerling, John F. "Waveguide Components and Configurations for Optimal Performance in Microwave Heating Systems," Gerling Applied Engineering, Inc. 2000.

Ryynanen, Suvi, "Microwave Heating Uniformity of Multicomponent Prepared Foods," Academic Dissertation. EKT Series 1260. University of Helsinki, Department of Food Technology. 86p. Helsinki, Finland., May 11, 2002.

Vollmer, Michael, "Physics of the Microwave Oven," Physics Education 39(1) p. 74-81, Jan. 2004; IOP Publishing Ltd. www.iop.org/journals/physed.

(56) References Cited

OTHER PUBLICATIONS

Lorence et al, Development of packaging and products for use in microwave ovens, 2009, pp. 25-28.
The Great Soviet Encyclopedia, 1979, Centrifuge <Http://encyclopedia2.thefreedictionary.com/centrifuge>.
Spencer Percy, Technology Brief 3: Microwave Ovens, Microwave Absorptions. pp. 1-2.

* cited by examiner

APPARATUS AND METHOD FOR ROASTING COFFEE BEANS

CROSS-REFERENCE TO RELATED APPLICATIONS

The present application is a continuation-in-part of and claims priority to pending U.S. patent application Ser. No. 15/180,780, filed on Jun. 13, 2016, which is a continuation-in-part of U.S. patent application Ser. No. 13/794,519, filed on Mar. 11, 2013, the entirety of each of which is incorporated by this reference.

FIELD OF THE INVENTION

The present invention relates to novel devices and methods for roasting beans, such as coffee beans, using microwave energy.

BACKGROUND OF THE INVENTION

Roasting coffee transforms the chemical and physical properties of green coffee beans into roasted coffee products. The roasting process is what produces the characteristic flavor of coffee by causing the green coffee beans to change in taste. Unroasted beans contain similar if not higher levels of acids, protein, sugars and caffeine as those that have been roasted, but lack the taste of roasted coffee beans due to the Maillard and other chemical reactions that occur during roasting. The Maillard reaction is a chemical reaction between amino acids and reducing sugars that gives browned food its desirable flavor.

The vast majority of coffee is roasted commercially on a large scale, but small-scale commercial roasting has grown significantly with the trend toward "single-origin" coffees served at specialty shops. Some coffee drinkers even roast coffee at home as a hobby in order to both experiment with the flavor profile of the beans and ensure the freshest possible roast.

The coffee-roasting process follows coffee processing and precedes coffee brewing. It consists essentially of sorting, roasting, cooling, and packaging but can also include grinding in larger-scale roasting houses. In larger operations, bags of green coffee beans are hand- or machine-opened, dumped into a hopper, and screened to remove debris. The green beans are then weighed and transferred by belt or pneumatic conveyor to storage hoppers. From the storage hoppers, the green beans are conveyed to the roaster. Initially, the process is endothermic (absorbing heat), but at around 175° C. (347° F.) it becomes exothermic (giving off heat). For the roaster, because the beans are heating themselves, an adjustment of the roaster's heat source might be required. At the end of the roasting cycle, the roasted beans are dumped from the roasting chamber and air-cooled with a draft inducer.

In Vietnam coffee is often coated with oil (traditionally clarified butter) and a small amount of sugar prior to roasting to produce a "butter roast". The roasting process results in an additional caramelized coating on the beans.

The most common roasting machines are of two basic types: drum and hot air. There are also packed-bed, tangential and centrifugal roasters. Roasters can operate in either batch or continuous modes. Drum roasting machines consist of horizontal rotating drums that tumble the green coffee beans in a heated environment. The heat source can be supplied by natural gas, liquefied petroleum gas (LPG), electricity or wood. The most common employ indirectly heated drums where the heat source is under the drum. Direct-fired roasters are roasters in which a flame contacts the beans inside the drum. Fluid Bed or hot air roasters force heated air through a screen or perforated plate under the coffee beans with sufficient force to lift the beans. Heat is transferred to the beans as they tumble and circulate within this fluidized bed.

Various attempts in the art have been made to roast coffee beans using microwave energy. For example, U.S. Pat. No. 4,326,114 discloses a microwave oven incorporated in a coffee bean roasting system and includes a rotatable microwave transparent tube or drum positioned within the same and at an angle to the horizontal, through which coffee beans are introduced at an upper end and flow in continuous agitation to the lower end while being subjected to microwave fields within the oven. At the lower end of the oven a separate section is preferably provided for subjecting the coffee beans to selective treatment during the final stages of the roasting process. In one form utilizing a unitary structure the separate section is provided by a conductive septum, which separates the oven into sections in which the power level is different. In the last section the power level is adjusted to control the final critical phase of the roasting process. The oven terminates into a cooling and quenching chamber from which the beans are delivered through a microwave trap to a further cooling stage to rapidly reduce their temperature to well below roasting.

Other devices have been disclosed for providing a device for roasting coffee beans in a conventional microwave oven. Such devices are disclosed in U.S. Pat. Nos. 7,235,764 and 6,436,457. PCT Application Pub. No. WO 2008/087622 A2 discloses an open roasting pan for inserting into a common or microwave based home oven for roasting coffee beans. The roasting, however, takes about 20 to 25 minutes.

A number of names have been commonly used to identify the various degrees of roast, such as City Roast and French Roast, based on the internal bean temperatures found during roasting. Often, a recipe known as a "roast profile" is followed to obtain certain flavor characteristics of the roasted coffee beans. A number of factors can affect the best profile to use, such as the coffee bean's origin, variety, processing method, moisture content, bean density and/or desired flavor characteristics. A roast profile can be presented as a graph showing time on one axis and temperature on the other, which can be recorded manually or using computer software and data loggers linked to temperature probes inside various parts of the roaster.

As the coffee beans absorb heat during roasting, the color shifts to yellow and then to increasingly darker shades of brown. During the later stages of roasting, oils appear on the surface of the bean. The roast will continue to darken until it is removed from the heat source. Coffee also darkens as it ages, making color alone a poor roast determinant. Most roasters use a combination of temperature, smell, color, and sound to monitor the roasting process. The most popular, but probably the least accurate, method of determining the degree of roast, however, is to judge the bean's color by eye. To obtain more accurate roasts, devices that quantitatively measure the roast have also been developed. For example, Agtron, Inc. of Reno, Nevada sells coffee roast analyzers that include spectrophotometers to analyze the degree of roast of ground and whole bean coffee. The Agtron analyzers use a narrow band of near-infrared energy to evaluate the coffee roast both as a whole bean and in a ground form.

Sound is a good indicator of temperature during roasting. There are two temperature thresholds called "cracks" that roasters listen for. At approximately 196° C. (385° F.), the coffee will emit a cracking or roasting sound. This point is referred to as "first crack," marking the beginnings of a "light roast." At first crack, a large amount of the coffee's moisture has been evaporated and the beans will increase in size. When the coffee reaches approximately 224° C. (435° F.), it emits a "second crack," this sound represents the structure of the coffee starting to collapse. If the roast is allowed to progress too much further, the coffee will fully carbonize and eventually combust.

The following table sets forth various common roasts based on bean temperature and a description of the resulting roast at that temperature.

desirable to utilize freshly roasted coffee beans that have retained significant amounts of carbon dioxide to produce the most desirable brewed coffee products.

Conventional coffee bean roasting methods, including those that have attempted to use microwave energy, have various disadvantages. One common disadvantage to all such roasting methods is that they take too much time to produce roasted coffee beans on demand. In addition, such roasting methods often require specialized equipment that is configured to prepare large quantities of roasted coffee beans, which may not remain fresh if not used within a few

| | |
|---|---|
| Green Beans - 22° C. (72° F.) Green coffee as it arrives at the dock. They can be stored for approximately 12-18 months in a climate-controlled environment before quality loss is noticeable. | Drying Phase - 165° C. (329° F.) During the drying phase the beans are undergoing an endothermic process until their moisture content is evaporated, signifying first crack. |
| Cinnamon Roast - 196° C. (385° F.) A very light roast level that is immediately at first crack. Sweetness is underdeveloped, with prominent toasted grain, grassy flavors, and sharp acidity prominent. | Light Roast - 205° C. (401° F.) Moderate light brown, but still mottled in appearance. A preferred roast for some specialty roasters highlights origin characteristics as well as complex acidity. |
| American Roast - 210° C. (410° F.) Medium light brown, developed during first crack. Acidity is slightly muted, but origin character is still preserved. | City Roast - 219° C. (426° F.) Medium brown, common for most specialty coffee. Good for tasting origin character, although roast character is noticeable. |
| Full City Roast - 225° C. (437° F.) Medium dark brown with occasional oil sheen, roast character is prominent. At the beginning of second crack. | Vienna Roast - 230° C. (446° F.) Moderate dark brown with light surface oil, more bittersweet, caramel flavor, and acidity muted. In the middle of second crack. Any origin characteristics have become eclipsed by roast at this level. |
| French Roast - 240° C. (464° F.) Dark brown, shiny with oil, burnt undertones, acidity diminished. At the end of second crack. Roast character is dominant; none of the inherent aroma or flavors of the coffee remain. | Italian Roast - 245° C. (473° F.) Nearly black and shiny, burnt tones become more distinct, acidity nearly eliminated, thin body. |

As noted in the table above, green coffee beans can be stored for approximately 12-18 months before quality loss is noticeable. However, for coffee beans to be considered part of the "current crop," the storage time cannot exceed one year. If the green coffee remains in storage for longer than a year, it is considered old crop, and is less valuable because of its drier state. Once the coffee is roasted, however, the shelf life is significantly reduced.

After roasting, the coffee beans contain carbon dioxide that is emitted from the beans over time. For dark-roasted coffee, the beans can emit up to 10 liters per kilogram of coffee. The roasted coffee beans rapidly emit carbon dioxide over the first few days after roasting, then more gradually over the remainder of what is referred to as the degassing period. The carbon dioxide in the roasted coffee beans forms a barrier against oxidation, which is part of staling that degrades quality by altering the roasted coffee bean's essential oils and aromatic components. Exposure to moisture, high temperature and light after coffee beans have been roasted are also known to detrimentally affect the quality of the roasted coffee beans by accelerating oxidation of the roasted coffee beans and degrading their aroma. Thus, it is desirable to limit the time of storage of roasted coffee beans to obtain the best quality coffee.

As noted above, retention of carbon dioxide in the beans is desirable for a number of reasons. In addition, for preparing espresso, the carbon dioxide in the roasted coffee beans creates the highly desirable "crème" (the silky foam that forms on the top of the brewed coffee). Thus, it is days. The methods used previously can also result in non-uniform heating of the roasted coffee beans, resulting in uneven or incomplete roasting of some of the beans.

Although standard multi-mode kitchen microwave devices have been used in the art for roasting coffee beans, the long processing times can result in burning of some of the coffee beans while other coffee beans in the same batch are under roasted. Non-uniform roasting will affect the taste and aroma characteristics of the resulting coffee brewed form such beans. As a result, the processing times, costs of production and losses in efficiency and quality of end product are compromised.

Improvements in the prior art methods have been subject to certain constraints. For example, the prior art specifically teaches that roasted coffee bean results are sensitive to the rate of rise of the temperature of the coffee beans during roasting. For roasting coffee beans in a roasting pan, the prior art teaches preheating a roasting pan to about 260° C. (500° F.), which is extremely hot and can result in sever burns if not handled correctly. At this temperature, the roasting takes about 8-10 minutes, with the first crack at approximately 5 minutes. After roasting, the beans must be quickly cooled to prevent further internal roasting as a result of heat that is retained in the beans from the roasting process.

Thus, there exists a need in the art to provide a method, system and device for improving coffee roasting. The various aspects and embodiments of the present invention, as described below, represent novel improvements on the above devices and methods of the prior art.

SUMMARY OF THE INVENTION

The present invention relates to improved systems and devices for producing roasted beans, grains or seeds rapidly to provide various improvements over conventional production systems and methods. Various aspects of the invention can be used to produce roasted beans more rapidly and having greater control over roasting quality and type, without burning the beans, despite the significantly higher intensity of microwave energy used.

In one aspect, the present invention relates to a microwave device for roasting coffee beans. In one embodiment, the microwave device comprises a roasting chamber for containing beans; a microwave emitter configured to produce microwave energy within the roasting chamber; a microwave energy focusing device configured to generate focused microwave energy within the roasting chamber and creating a stable microwave high intensity microwave region in the roasting chamber; and an air blower for causing movement of the beans within the roasting chamber and causing the beans to move within the roasting chamber. In one configuration, the air blower is configured to move beans in the roasting chamber at a sufficient speed to substantially uniformly heat the beans. In another configuration, the air blower is configured to circulate beans within the roasting chamber at a velocity greater than 1 revolution per second. The air blower may be any type of air blower, for example, an axial or propeller fan, a centrifugal or radial fan, a turbine, an air compressor, cross-flow fans, combinations of such air blowers, and the like. The moving beans are subjected to focused microwave energy within the roasting chamber, sufficient to more uniformly heat the beans and cause the beans to roast. Depending on the time of exposure to the focused microwave energy, the type of roast desired for the beans can be precisely controlled.

In another aspect, there is provided an apparatus for roasting beans comprising: a roasting chamber for containing beans; a microwave emitter configured to produce microwave energy within the roasting chamber and heat the beans to a roasting temperature; and at least one air blower disposed in communication with the roasting chamber for moving beans within the roasting chamber. The roasting chamber is at least partially disposed within a waveguide for channeling microwave energy into the roasting chamber. In yet another configuration, the roasting chamber is smaller than a wavelength of the microwave.

In another aspect, there is provided an apparatus for roasting beans, comprising: a roasting chamber configured to contain beans; a microwave emitter configured to produce microwave energy within the roasting chamber and heat the beans; a single-mode resonant microwave applicator configured to generate a stable focused high intensity microwave region within the roasting chamber; and an air blower configured to create airflow within the roasting chamber sufficient to move the beans within the roasting chamber.

In another configuration, there is provided an apparatus for roasting beans, comprising: a roasting chamber for containing beans; a microwave emitter configured to produce microwave energy within the roasting chamber and heat the beans; a single-mode resonant microwave applicator configured to generate a standing microwave energy field comprising an array of one or more high intensity microwave regions; and a device configured to move beans within the high intensity microwave regions. In one embodiment, the device configured to move beans within the high intensity microwave region comprises a stirring or mixing device within the roasting chamber to move the beans within the roasting chamber. In another embodiment, the device configured to move beans within the high intensity microwave region comprises a spinning cup within which the beans are positioned.

In another configuration, an air blower is configured to blow air into the roasting chamber to remove chaff during the roasting process. Chaff is the brown flaky skin of the bean that comes off the bean during the roasting process.

In another configuration, the air blower is configured to blow air hot air into the roasting chamber during the roasting process to aid in the roasting process and to blow cool or ambient temperature air into the roasting chamber after the roasting process to aid in quickly cooling the roasted beans. Thus, the air blower may also comprise a heater for heating the airflow to be passed through the roasting chamber.

In another configuration, the present invention also provides a coffee roasting vending machine, comprising: a bean holding chamber configured to store and dispense unroasted beans; a roasting chamber comprising an inlet configured to receive unroasted beans from the bean holding chamber; a microwave emitter configured to produce microwave energy within the roasting chamber and heat the beans; a single-mode resonant microwave applicator configured to generate a stable focused high intensity microwave region within the roasting chamber; a device disposed in the roasting chamber for circulating and/or moving the beans within the stable focused high intensity microwave region. In another configuration, the machine is adapted to be activated by a purchase transaction. In another configuration, the purchase transaction comprises payment by any one or more of a coin, paper bill, plastic charge card, or token. In another configuration, the purchase transaction comprises electronic payment.

In another configuration, the apparatus may also comprise an outlet channel connected to the roasting chamber for discharging roasted beans. In another aspect, the apparatus may also comprise a heater for heating the airflow to be passed through the roasting chamber. In another configuration, the apparatus may comprise a control module for controlling the temperature, flow rate, and flow path of the air. In another configuration the apparatus may comprise a metering system for delivering a specified quantity of beans to the roasting chamber.

In one configuration, the high intensity microwave region includes a microwave energy maxima located within the roasting chamber. In another configuration, a single high intensity microwave region is located within the roasting chamber. In another configuration, a plurality of high intensity microwave regions are located within the roasting chamber. In yet another configuration, the high intensity microwave region excludes a microwave energy maxima located within the roasting chamber. In another configuration, a plurality of high intensity microwave regions are located within the roasting chamber. In yet another configuration, the high intensity microwave region includes a microwave energy maxima located within the roasting chamber. In another configuration, a single high intensity microwave region is located within the roasting chamber. In another configuration, a plurality of high intensity microwave regions are located within the roasting chamber. In another configuration, the roasting chamber has a diameter that is greater than the microwave wavelength. In yet another configuration, the diameter of the roasting chamber is such that beans circulating within the roasting chamber pass through a microwave energy maxima of two adjacent high intensity microwave regions. In another configuration, the roasting chamber encompasses a perimeter of two adjacent high intensity microwave regions that excludes a microwave energy maxima.

In one aspect, the device is configured such that the roasting chamber is between two adjacent microwave energy minima nodes. In various configurations, a sidewall of the roasting chamber is positioned such that beans at a roasting chamber sidewall pass through a portion of the high intensity microwave region wherein the energy intensity is at least 50% of the energy maxima, the energy intensity is at least 60% of the energy maxima, the energy intensity is at least 70% of the energy maxima, the energy intensity is at least 80% of the energy maxima, the energy intensity is at least 90% of the energy maxima, or the energy intensity is 100% of the energy maxima. In another configuration, the diameter of the roasting chamber is approximately equal to one-half wavelength and the roasting chamber is positioned such that beans at a roasting chamber sidewall pass through two adjacent high intensity microwave regions. In another configuration, the diameter of the roasting chamber is approximately equal to one-half wavelength and the roasting chamber is positioned such that beans at a roasting chamber sidewall pass approximately through the energy maxima of two adjacent high intensity microwave regions. In another configuration, the apparatus comprises a plurality of anti-node high intensity microwave regions. In another configuration, the roasting chamber encompasses a plurality of high intensity microwave regions and wherein the blower is configured to rapidly move the beans through the high intensity microwave regions. In another configuration, the apparatus comprises a plurality of roasting chambers, wherein substantially all of each of the one or more high intensity microwave regions is located within one of the plurality of roasting chambers. In another configuration, the single-mode resonant microwave applicator is configured to generate microwave intensity within the roasting chamber to subject the beans to microwave energy sufficient to roast one or more of the beans within approximately 13-50 seconds. In another configuration, the device comprises two or more microwave energy sources such that the two or more microwave energy sources constructively interfere at approximately the same location within the roasting chamber.

In accordance with one aspect of the invention, the apparatus comprises an airflow input and an airflow outlet and the air blower causes airflow to pass in the airflow input, through the roasting chamber, and out of the airflow outlet. In another aspect, the air blower is configured to cause airflow within the roasting chamber in a horizontal direction sufficient to move beans in a generally horizontal and generally circular path in the roasting chamber. In another aspect, the apparatus comprises an air input in the side of the roasting chamber, wherein the horizontal airflow comprises airflow input into the roasting chamber from the side of the roasting chamber at an angle generally tangential to the roasting chamber. In another aspect, the air blower may be one or more blowers for creating an airflow pattern within the roasting chamber to thereby move the beans. In one configuration, the roasting chamber is generally cylindrical in shape and the air blower is configured to cause airflow within the roasting chamber in an approximately circular path and move the beans horizontally within the roasting chamber in an approximately circular path. In another configuration, the air blower is configured to cause airflow within the roasting chamber in a vertical direction, from a lower portion of the roasting chamber upwardly to an upper portion of the roasting chamber. This may include an airflow that starts generally horizontally to cause the beans to move in a generally circular direction within the roasting chamber. The airflow may also be configured to form a helical movement path so that it causes the beans to move generally circularly within the roasting chamber and then moves upwardly in a helical or spiral configuration to carry chaff from the roasted beans out of the roasting chamber. In the alternative, two air flow paths could be used with one being more vertical. In another configuration, the air blower is configured to cause the vertical airflow at a rate sufficient to selectively move chaff from roasted beans out of the roasting chamber when roasted. In another configuration, the air blower is configured to create airflow in both a vertical direction and a horizontal direction.

In another aspect of the invention, airflow may be directed from two different sources to create a desired movement pattern for beans during roasting and then to cool the beans after roasting. One pattern may be configuration to provide substantially circular airflow of the beans prior to roasting while the other may be configured to cool the beans after roasting. Alternatively, a single airflow source may be provided to perform both functions.

In accordance with another aspect of the invention, the beans may be moved within the high intensity microwave region by means of a rotating roasting chamber, such as a spinning cup, which causes the beans to circulate with the roasting chamber while they are subjected to microwave energy. In one configuration, the spinning cup has sides that are longitudinally sloping. In another configuration, the spinning cup has an internal flange forming a lip, wherein the lip prevents beans from escaping the spinning cup, but allows chaff to escape the spinning cup. In yet another configuration, the roasting chamber comprises a spinning cup that is configured to move beans within the high intensity microwave regions.

In accordance with another aspect of the invention, the beans may be moved within the roasting chamber with a rotating stirring rod, which causes the beans to circulate with the roasting chamber while they are subjected to microwave energy. In one configuration, the stirring rod is positioned proximate a bottom surface of the roasting chamber. In another configuration, the stirring rod is positioned along a sidewall of the roasting chamber.

In accordance with one aspect of the invention, a heating element may be used to heat air passing into the roasting chamber. The air being blown into the airflow chamber may, for example, above ambient room temperature of about 20° C. up to about 245° C. to assist in the roasting process.

In another aspect, the present invention involves a roasting chamber for containing beans and a single-mode resonant microwave applicator for generating a standing microwave energy field comprising an array of one or more anti-node high intensity microwave regions. The beans are subjected to the microwave energy in the one or more high intensity microwave regions, sufficient for the beans to achieve a substantially uniform distribution of heat to cause the beans to roast.

In accordance with another aspect of the invention, a microwave device is provided for roasting cereal grain and seed beans includes a microwave energy source; a single-mode resonant waveguide applicator wherein the waveguide is configured to focus microwave energy from the microwave energy source at one or more regions within the waveguide; a roasting chamber for heating beans, and an outlet in communication with the roasting chamber for discharging roasted beans; and at least one air source for circulating air within the lower portion of the roasting chamber and for passing air from the lower portion of the roasting chamber to the upper portion of the roasting chamber.

Because the system of roasting according to the present invention generates smoke during the roasting process, the system may also comprise a venting system for venting smoke from the device. In one embodiment, air from an air blower is used to transport the smoke from the roasting chamber through a smoke vent and into a vent duct of a structure within which the system is installed. In another embodiment, the air from the air blower is used to transport the smoke from the roasting chamber through a filter to remove smoke particles.

In accordance with another aspect of the invention, the improved system and method of making roasted beans heats beans with microwave electromagnetic radiation by creating high intensity microwave regions within a roasting chamber. The beans are heated in the high intensity microwave regions until they roast to a desired degree. During the process, airflow that passes through the roasting chamber from a lower portion of the chamber to an upper portion of the chamber may be used to remove chaff from the roasting chamber.

In one aspect, the present invention also contemplates novel methods for roasting beans, comprising moving beans within a roasting chamber and subjecting the beans to focused microwave energy sufficient to cause the beans to roast, resulting in roasted beans. In yet another aspect, the present invention comprises a method for roasting beans, comprising generating a standing microwave energy field in a single-mode resonant microwave applicator, wherein the standing microwave energy field comprises an array of one or more high intensity microwave regions and subjecting beans to the microwave energy in the one or more high intensity microwave regions, sufficient to cause the beans to roast and produce roasted beans.

In one embodiment, a method is provided that comprises the steps of passing electromagnetic microwave radiation through a roasting chamber and maintaining at least one anti-node of at least one microwave at a fixed location within the roasting chamber. The beans are heated with the microwave radiation at approximately the location of the one or more anti-node.

In another aspect, the present invention provides a method of roasting beans, comprising moving beans within a roasting chamber with a stirring device or airflow; and subjecting the beans to microwave energy sufficient to cause the beans to roast, resulting in roasted beans. In one embodiment, the microwave energy is focused microwave energy.

In yet another aspect, the present invention provides a method for roasting beans, comprising generating in a single-mode resonant microwave applicator a standing microwave energy field comprising an array of one or more anti-node high intensity microwave regions, and subjecting beans to the microwave energy in the one or more high intensity microwave regions, sufficient for the beans to achieve a substantially uniform distribution of microwave energy heat to cause the beans to roast.

In yet another aspect, the present invention provides a method for roasting beans comprising generating in a single-mode resonant microwave applicator a standing microwave energy field comprising an array of one or more high intensity microwave regions; providing a roasting chamber encompassing the one or more high intensity microwave regions; delivering beans to the roasting chamber, wherein the beans are moved through the microwave high intensity microwave region within the roasting chamber to achieve a highly uniform distribution of microwave energy heat until roasted; and selectively discharging roasted beans from the roasting chamber.

In one aspect, the present invention includes the roasting chamber being smaller than the wavelength of the microwave energy being passed through the roasting chamber, such that the beans can circulate around and through the high intensity microwave region located within the roasting chamber. In one particular embodiment, the diameter of the roasting chamber is between about 1.75 inches (4.45 cm) and about 3 inches (7.62 cm). In another embodiment, the diameter of the roasting chamber is between about 2 inches (5.08 cm) and about 2.5 inches (6.35 cm). The small diameter of the roasting chamber subjects the beans to a high dose of microwave energy, causing it to roast rapidly. Movement of the beans within the roasting chamber makes the bean heat evenly to provide an evenly roasted bean. Thus, the present invention allows for rapid roasting without many of the drawbacks identified in the art.

In another aspect, the single-mode resonant microwave applicator generates a standing microwave pattern comprising an electric field distribution of n half-wavelengths, where n is an integer. This may include where n is greater than 1.

In one aspect, the present invention may include a plurality of roasting chambers. The microwave energy may be channeled such that each roasting chamber has a high intensity microwave region disposed therein and so that the beans move within the high intensity microwave region.

In one aspect, the single-mode resonant microwave applicator may be configured to generate microwave energy at a frequency from between approximately 800 MHz and 30 GHz. In some aspects, the microwave frequency is from between approximately 1 GHz to 5 GHz. In more typical applications, the microwave frequency is from between approximately 2 GHz to 3 GHz. Many commercial microwaves use microwave frequency at about 2.54 GHz. The microwave energy source may comprise a magnetron as is known in the art of microwave ovens or one or more microwave emitting chips. Such microwave chips may be arranged in an array to provide sufficient microwave energy for roasting the beans. In addition, because such the microwave chips are capable of emitting microwaves at various frequencies and energies, a control system may be employed to vary the microwave energy being emitted from the microwave chips to control roasting at various stages of the roasting process. For example, the microwave energy from the chips can be varied during the roasting process so that the beans are roasted at different microwave energies at different stated of roasting.

In accordance with one aspect of the present invention a single-mode resonant microwave applicator may be configured to generate microwave intensity within the roasting chamber to subject the beans to microwave energy sufficient to roast one or more of the beans within approximately 25-50 seconds. Thus, an entire batch of beans may be roasted in less than 30 seconds depending on the desired roast.

In one aspect, the present invention may include a device with two or more microwave energy sources such that the two or more microwave energy sources constructively interfere at approximately the same location within the roasting chamber.

In another aspect, the present invention may include a device for continuously feeding beans into the roasting chamber. In one embodiment, the present invention includes a conveyor or bean feeding system for moving the beans through the focused microwave energy in a continuous or semi-continuous process.

In yet another embodiment of an apparatus for roasting coffee beans, the roasting chamber device comprises an elongate microwave permeable tube and a screen attached to a distal end of the microwave permeable tube.

In another aspect of the invention, a vortex generator is in fluid communication with the distal end of the microwave permeable tube of the roasting chamber device. The vortex generator generates a flow of air in vortex form into the microwave permeable tube to circulate the coffee beans within microwave permeable tube while being exposed to the one or more high intensity microwave regions.

In another aspect of the invention, the roasting chamber device comprises a second tube extending from the microwave permeable tube and a handle coupled to the second tube. At least a portion of the second tube extends out of the waveguide and the handle is exposed for grasping the roasting chamber device.

In yet another aspect of the invention, the roasting chamber device further comprises at least one laterally extending protrusion configured for coupling with a retaining member coupled to the waveguide to secure the roasting chamber device to the waveguide during a bean roasting process.

In another embodiment of the invention, the vortex generator comprises a blower in fluid communication with the roasting chamber for directing a flow of air in vortex form through the roasting chamber during roasting of the coffee beans to move the coffee beans in a generally circular path within the roasting chamber.

In yet another embodiment of the invention, the screen defines one or more apertures that are sized to prevent coffee beans from passing through the one or more apertures. The flow of air from the vortex generator passes through the one or more apertures.

In another aspect of the invention, the air entering the roasting chamber is heated from between about 140 degrees C. to 180 degrees C.

In another aspect of the invention, the elongate microwave permeable tube is cylindrical.

In yet another aspect of the invention, the vortex generator generates a toroidal flow of air within the elongate microwave permeable tube to circulate the coffee beans in a toroidal path within the elongate microwave permeable tube.

In another aspect of the invention, the second tube is comprised of metal.

In another aspect of the invention, the elongate microwave permeable tube is comprised of polytetrafluoroethylene.

In another aspect of the invention, the inner surfaces of the waveguide are nickel plated and the top wall, bottom wall, first and second side walls and first and second end walls are joined together by continuous welds along their respective joints.

According to the National Coffee Association's website at www.ncausa.org, "Roasting is both an art and a science. It takes years of training to become an expert roaster with the ability to 'read' the beans and make decisions with split-second timing. The difference between perfectly roasted coffee and a ruined batch can be a matter of seconds." The systems and methods of the present invention for roasting coffee beans eliminates the guesswork of prior art roasting methods by providing a rapid and controlled roasting of coffee beans using focused microwave energy.

These and other aspects of the present invention are realized as shown and described in the following figures and related description.

BRIEF DESCRIPTION OF THE DRAWINGS

When considered in connection with the following illustrative figures, a more complete understanding of the present invention may be derived by referring to the detailed description. In the figures, like reference numbers refer to like elements or acts throughout the figures.

Figure 1:
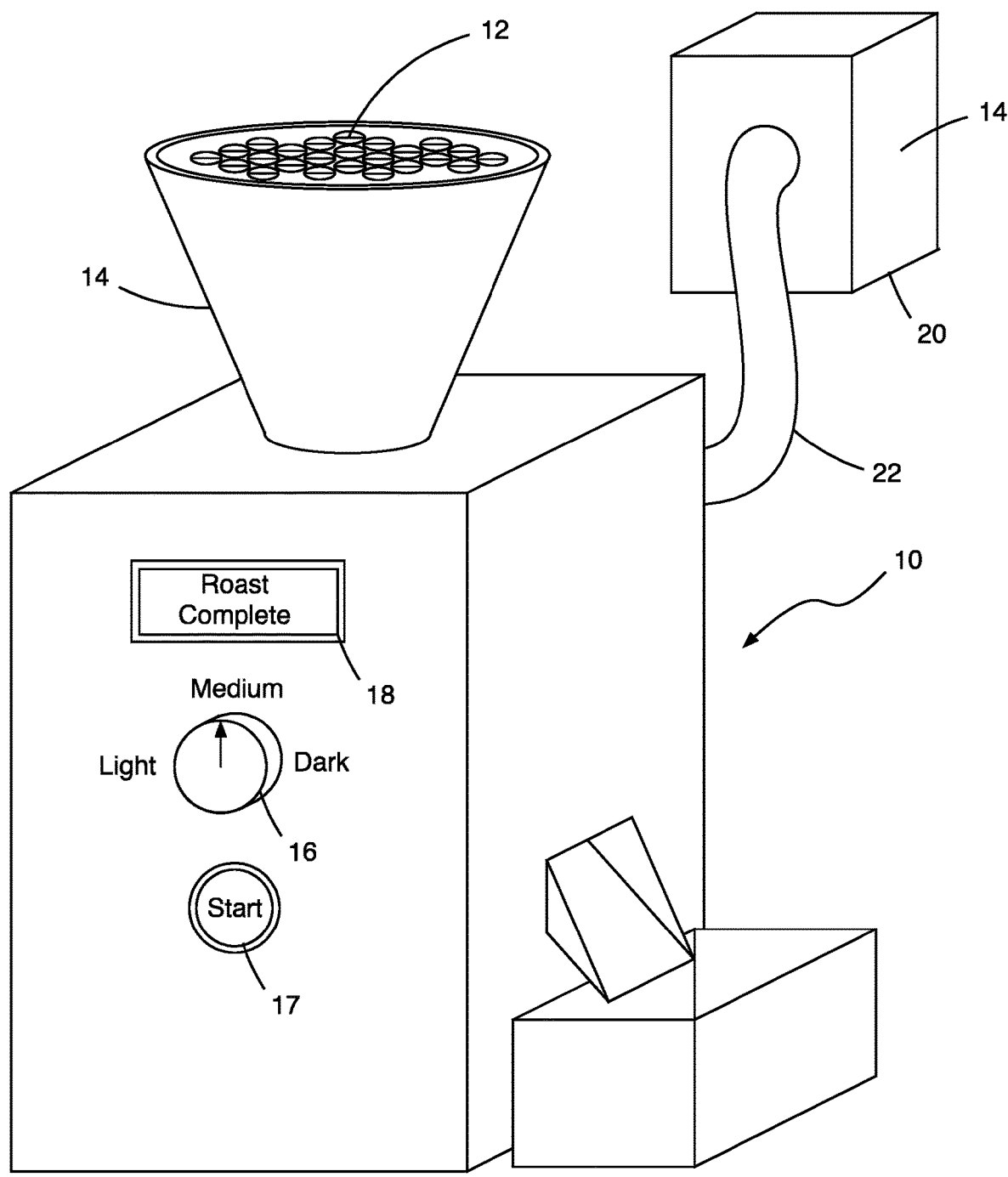
FIG. 1 shows a perspective view of an apparatus for roasting coffee in accordance with the principles of the present invention.

It will be appreciated that the drawings are illustrative and not limiting of the scope of the invention, which is defined by the appended claims. The embodiments shown accomplish various aspects and objects of the invention. It is appreciated that it is not possible to clearly show each element and aspect of the invention in a single figure, and as such, multiple figures are presented to separately illustrate the various details of the invention in greater clarity. Similarly, not every embodiment need accomplish all advantages of the present invention. Elements and acts in the figures are illustrated for simplicity and have not necessarily been rendered according to any particular sequence or embodiment.

DETAILED DESCRIPTION

The invention and accompanying drawings will now be discussed in reference to the numerals provided therein so as to enable one skilled in the art to practice the present invention. The drawings and descriptions are exemplary of various aspects of the invention and are not intended to narrow the scope of the appended claims. Unless specifically noted, it is intended that the words and phrases in the specification and the claims be given their plain, ordinary and accustomed meaning to those of ordinary skill in the applicable arts. It is noted that the inventors can be their own lexicographers. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f) or pre-AIA 35 U.S.C. § 112 ¶ 6. Thus, the use of the words "function," "means" or "step" in the Detailed Description of the Invention or claims is not intended to somehow indicate a desire to invoke the special provisions of 35 U.S.C. § 112(f) or pre-AIA 35 U.S.C. § 112 ¶ 6 to define the invention. To the contrary, if the provisions of 35 U.S.C. § 112(f) or pre-AIA 35 U.S.C. § 112 ¶ 6 are sought to be invoked to define the inventions, the claims will specifically and expressly state the exact phrases "means for" or "step for" and the specific function (e.g., "means for roasting"), without also reciting in such phrases any structure, material or act in support of the function. Thus, even when the claims recite a "means for . . . " or "step for . . . " if the claims also recite any structure, material or acts in support of that means or step, or that perform the recited function, then it is the clear intention of the inventor not to invoke the provisions of 35 U.S.C. § 112(f) or pre-AIA 35 U.S.C. § 112¶ 6. Moreover, even if the provisions of 35 U.S.C. § 112(f) or pre-AIA 35 U.S.C. § 112 ¶ 6 are invoked to define the claimed inventions, it is intended that the inventions not be limited only to the specific structure, material or acts that are described in the illustrated embodiments, but in addition, include any and all structures, materials or acts that perform the claimed function as described in alternative embodiments or forms of the invention, or that are well known present or later-developed, equivalent structures, material or acts for performing the claimed function.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. Thus, the full scope of the inventions is not limited to the examples that are described below.

Various aspects of the present invention may be described in terms of functional block components and various processing steps. Such functional blocks may be realized by any number of hardware or software components configured to perform the specified functions and achieve the various results.

Various representative implementations of the present invention may be applied to any system for roasting beans or other food products or food stuff. Thus, while there is disclosed improved systems, devices and methods for roasting coffee beans, it will be understood that references in the following disclosure to systems and devices are also applicable to other food stuff and methods, which utilize related structures for the processes recited. Similarly, references to methods are also applicable of systems and devices, which perform the processes in the operation of the recited devices. It will be appreciated that numerous changes may be made to the present invention without departing from the scope of the claims, including but not limited to combinations of elements or structures of the various illustrated embodiments.

As used herein, the following terms have the meaning set forth below:

The term "bean" means any one or more of several varieties of beans, such as coffee beans, that are commonly roasted to produce a product that can be ground or otherwise processed for producing a beverage or food product. Suitable beans capable of being roasted include, for example, coffee beans, cocoa beans, and the like. Although the specification herein refers frequently to "coffee" as the exemplary bean, it is understood that the various apparatus, device and method embodiments described herein may be used for roasting other beans, grains or seeds other than coffee beans and that the scope of the claims referring to a "bean" or "beans" encompasses all such varieties of beans, grains or seeds capable of being roasted, and shall not be limited by any particular references in the specification to "coffee beans."

The term "cracked bean" means a bean that has been heated sufficiently to cause the bean to expand and emit an audible crack.

The term "roasted bean" means a bean that has been heated sufficiently to achieve a desired roast.

The term "focused microwave energy" means microwave energy that has been directed or focused into a defined area, resulting in a substantially stable and homogeneous field pattern surrounding the load being subject to the microwaves. Focused microwave energy may be generated, for example, by reflecting microwaves in a multi-mode microwave applicator having multiple resonant modes of microwave energy propagation, or by generating a standing wave pattern in a single resonant mode (i.e., single-mode) microwave applicator, where the standing microwave pattern generates microwaves that constructively interfere to generate stable areas of high intensity microwave energy.

The term "high intensity microwave region" means a region of focused microwave energy in a microwave applicator, wherein the microwaves are of sufficiently high intensity to cause rapid heating and roasting of beans. A high intensity microwave region typically includes the location of maximum energy intensity. Although a high intensity microwave region may encompass the location of energy maxima, it does not necessarily include the point of energy maxima. Because, in a single-mode resonant microwave applicator, the energy intensity varies sinusoidally from the energy minimum (the node, where electro-magnetic waves destructively interfere) and the energy maximum (the anti-node, where the electro-magnetic waves constructively interfere), a high intensity microwave region may also encompass the region of energy intensity that is less than the energy maximum while excluding the actual location of energy maximum. A roasting chamber may encompass two high intensity microwave regions, without encompassing the points of energy maxima, where the perimeter of the roasting chamber (i.e., the sidewalls) passes through the region between the two energy maxima without actually passing through the energy maxima. Accordingly, a "high intensity microwave region" shall be construed to comprise those locations having a microwave energy greater than the microwave energy minima and having a stable well-defined microwave energy maxima.

The term "single-mode," as used in reference to microwave applicators herein, means that the superposition of incident and reflect waves in a resonant cavity results in a standing wave pattern with a single resonant mode of microwave energy, thereby generating high intensity microwave regions containing energy maxima that are stable at well-defined and predictable positions within the applicator. In contrast, traditional multi-mode microwave applicators propagate microwaves with multiple modes of energy, each with varying intensity and at irregularly spaced intervals. A single-mode resonant microwave applicators establish significantly higher electric field strengths compared to a traveling wave or a multi-mode applicator, and are generally more compact, as the dimensions of the resonant cavities are a function of the wavelength typically used for microwave heating (e.g., 2.45 GHz) of food articles. The particular size and dimensions of a single-mode microwave applicator can be determined by those skilled in the art of microwave heating, by utilizing Maxwell equations, which contain all the necessary parameters needed to define the standing wave pattern desired to be established in a particular case, including the geometry and dimensions of a resonant waveguide applicator operating in single-mode.

It is further understood that use of definite articles such as "the" or "a" shall be construed to include one or more elements and shall not be construed to be limited to a single element. Elements shall be limited to single elements only if expressly modified by a term such as "single," "one," "sole," "only," or the like.

The present invention generally relates to novel devices and methods for roasting beans which may achieve a variety of desired outcomes, such as decreased roasting times and improved roasting characteristics as set forth herein. The novel devices and method may utilize focused microwave energy to create a high intensity microwave field density that more uniformly heats beans at a high rate to cause the beans to achieve a desired final bean temperature, depending on the desired roast, substantially simultaneously and thereby roast more evenly and completely. Although the use of multi-mode microwave devices have been used in the art for roasting coffee beans, the present invention relates to the discovery that focused microwaves, such as single-mode microwave applicators, may result in improved roasting efficiency, as well as improved speed of roasting. In addition, the focused microwaves may result in improved roasted beans having lower density, larger size, higher roasting efficiency and improved taste characteristics.

The devices and methods described herein confer significant advantages over the prior art, including, for example, providing devices that are significantly smaller in size, which enables ease of storage and improved portability, and consume significantly less energy. For example, such devices may be used to provide roasted coffee beans for emergency humanitarian aid, disaster relief or military purposes, where there is a need to produce high volumes of roasted beans, inexpensively, in remote locations where there may be no significant energy infrastructure. The portability of the devices disclosed herein may also be a significant advantage where there is a demand for large quantities of freshly roasted coffee beans in restaurants or production facilities, as the devices enable high volume output of freshly roasted coffee beans, and avoid the need of advance production of roasted coffee beans that may not be fresh or that requires roasting off-site and transportation.

While various embodiments implementing different aspects of the present invention are discussed below, it has been found in accordance with the principles of the present invention than multiple advances may be achieved in the roasting of beans, and in particular the roasting of coffee beans. For example, in accordance with aspects of the invention it has been found that improvements in roasting coffee beans can be achieved by placing coffee beans in a roasting chamber disposed within a within a single high intensity microwave region, i.e. the chamber closely surrounds or encompasses the area of peak energy of a standing microwave signal. As the beans move within the high intensity microwave region, the beans are able to heat rapidly, thereby causing the beans to heat and roast in a much shorter period of time than conventional conduction, convection, air or microwave roasting systems known in the art. Additionally, all of the beans are subject to a substantially equal amount or dose of microwave energy over time to thereby more substantially simultaneously and uniformly heat each bean than conventional methods. This results in the beans being more rapidly and uniformly roasted in a relatively short period of time.

As compared to prior art roasting methods, the present invention significantly improves roasting time. Using a high intensity microwave device, in accordance with the present invention, roasting started and was completed within a significantly shorter period of time. With the time to first crack happening in as little as about 13-20 seconds, (on average within about 18 seconds), while roasting was completed within 24-50 seconds depending on the desired roast. Thus, the methods and systems of the present invention provide a significant improvement in the time it takes of initiate and finish roasting a batch of green coffee beans, showing a reduction in the average time of over 1200% for the darkest roasts.

Not only do the systems and methods of the present invention roast the coffee beans faster, it has been found that systems and methods of the present invention produces uniformly roasted beans. In addition, the rapid heating and roasting of the beans in accordance with the present invention resulted in roasted beans that have equivalent flavor as those that are roasted using traditional bean roasting techniques. Accordingly, the methods and systems of the present invention provide significant improvements to time required to roast coffee beans while maintaining the consistency, quality, flavor and aroma of the roasted coffee beans.

It has also been discovered that the use of high intensity microwaves in accordance with the present invention result in a significant reduction in power consumption. For example, a typical roasting process consumes significant energy to heat the roasting pan and to maintain the temperature of the roasting pan for the time necessary to roast the beans. A standard kitchen microwave consumes a significant amount of energy when operated for an extended period of time to roast coffee beans according to the prior art systems. In contrast, the use of a focused microwave device in accordance with the present invention consumes significantly less energy due to the reduced roasting times. The methods and devices of the present invention further result in significant reduction in energy consumption and cost savings.

Finally, the methods and devices of the present invention also result in a significant reduction or elimination of overly roasted beans. Roasted beans made by the methods and devices of the present invention, when compared to roasted beans made by methods and devices previously used (such as standard roasting pans), show significant reduction in burned or charred beans, which could potentially be toxic or carcinogenic.

Systems and Devices

The basic configuration of the systems and devices of the present invention comprises a microwave emitter, such as a magnetron or a microwave emitting semiconductor chip, connected to a microwave antenna for emitting microwave energy into a roasting chamber. The systems and devices may include a waveguide cavity or microwave focusing device, such as a single-mode resonant cavity, within which a roasting chamber is located. The purpose of the microwave cavity and associated hardware is to maximize the energy field at the load (the beans) and optimize the microwave coupling efficiency. The microwave applicators of the present invention generate high intensity microwaves within the roasting chamber to subject the beans to microwave energy sufficient to roast the beans to various degrees depending upon the desired roast, such as by way of example and not by limitation light roast, medium roast or dark roast.

One embodiment of a system for roasting beans in accordance with the present invention is shown in FIG. 1. A bean roasting system, generally indicated at 10, utilizes a microwave energy emitter for producing microwave energy within a roasting chamber within which a batch of uncooked beans 12 dispensed from a hopper 14 are positioned. The roasting system 10 is a self-contained unit that allows a user to select the degree of roast. For example and not by way of limitations, a selector knob 16 allows the user to select a light, medium or dark roast of the beans 12. The, user then presses the start button 17 to roast the beans according to the selected roast. Of course, the system for roasting beans 10 can be configured to in provide a number of roasting options as will be discussed in more detail herein. Once the roast is complete, as indicated by the display screen 18, the roasted beans are dispensed into a container to be used in making a brewed beverage, such as espresso or coffee, depending on the roast and subsequent grinding of the beans.

Because the roasting of beans 12, such as coffee beans, generates smoke, the system 10 is provided with a smoke filtration system 20. The smoke filtration system draws smoke from the roasting process through a conduit 22 and into filter 24. Alternatively, the system 20 could simply draw the smoke from the machine to a ventilation system of a home or building in which the roasting system 10 is installed. The filter 24 may comprise a HEPA filter capable of filtering smoke, an oil-based filter, water based filter, or other smoke filtration systems known in the art.

Figure 2:
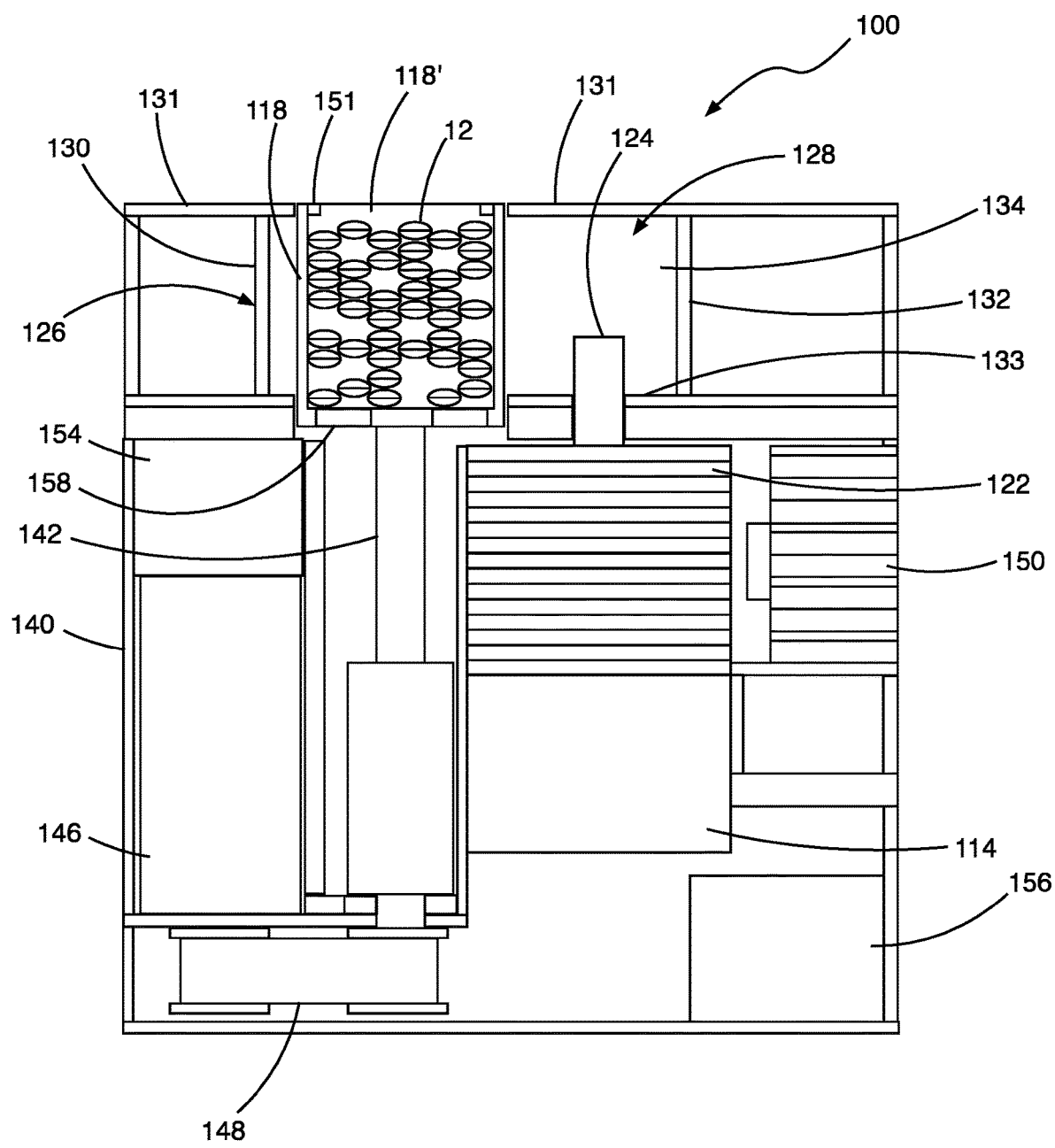
FIG. 2 shows a cross-sectional side view of another embodiment of an apparatus for roasting coffee in accordance with the principles of the present invention.

Referring now to FIG. 2, there is shown a bean roasting system, generally indicated at 100. The bean roasting system 100 includes microwave energy emitter 114 for producing microwave energy within a roasting chamber 118. Appropriate microwave energy emitters 114 are known and may be selected according to various design considerations known to those skilled in the art and determined without undue experimentation. For example, some microwave energy emitters comprise a magnetron 122 for generating microwaves and a magnetron antenna 124 disposed within a waveguide 126. Other microwave energy emitters comprise microwave semiconductor ships that may be arranged in an array to produce sufficient microwave energy within the waveguide to rapidly roast the beans. The waveguide 126 is configured to form a standing wave within the waveguide 126. The waveguide 126 thus serves to form a standing wave within the waveguide, and because the roasting chamber 118 is positioned within the waveguide, the waveguide also serves as a microwave applicator.

The magnetron 122 may generate microwave energy at any frequency suitable for roasting beans 12. Generally, beans may be heated with microwaves at a frequency ranging from 1 MHz up to 30 GHz. The range of frequencies more commonly used is from about 400 MHz to about 20 GHz. The ISM bands commonly used for industrial, scientific and medical uses (including heating/cooking food products), as prescribed by certain government regulatory agencies, include 896 MHz, 915 MHz and 2.45 GHz. For example, in some embodiments, the magnetron is tuned to generate microwave energy at a frequency that maximizes the rapid oscillation of water molecules in the load being heating, such as 2.45 GHz. As will be apparent to those skilled in the art, other operating frequencies may also be used effectively. The present invention contemplates use of microwave energy at any frequency suitable for roasting beans.

The selection of appropriate microwave generators is considered to be within the ordinary skill in the art. It is understood that typical microwave generators utilize magnetron oscillators, which may include continuous wave generators to produce a relatively narrow output frequency spectrum for use with small loads, as in the case of small batch volumes of beans. Microwave emitting semiconductor chips are also considered to be useful as an appropriate microwave generator for the bean roasting devised of the present invention.

Microwave Focusing Device

The present invention employs focused microwaves as a means of creating high intensity microwave energy for rapid high-temperature roasting of coffee beans. Microwave energy may be focused, for example, by reflecting microwaves in a multi-mode applicator so as to create a stable and homogeneous "high intensity microwave region" (defined below) at a defined location, such as within a small roasting chamber. Alternatively, microwave energy may be focused through use of adaptive microwave phased arrays to concentrate the microwave energy at a predetermined area. For example, suitable adaptively focused microwave systems may be constructed having a phased array of multiple radiating antenna elements for a tightly focused microwave beam having a maximum dimension on the order of 2-10 cm or larger, as described by Fenn A J, *Adaptive Antennas and Phased Arrays for Radar and Communications*, Norwood, M A, Artech House Publishers, 133-160 (2008). Alternatively, microwave energy may be focused by use of a single-mode microwave applicator, which generates a stable standing wave pattern having one or more "high intensity microwave region" of energy maxima. Other techniques and devices for focusing microwaves are also contemplated to be within the scope of the present invention.

In accordance with the present invention, one particular microwave energy focusing device is shown in FIG. 2. The microwave energy focusing device of the present invention as shown in FIG. 2 comprises a waveguide 126, which defines a microwave cavity 128 within which a roasting chamber 118 containing coffee beans 12 is located. The microwave energy focusing device provides for high intensity focused microwave energy within the roasting chamber 118 and creates one or more stable evenly-spaced microwave anti-node high intensity microwave regions in the roasting chamber. The waveguide 126 is comprised of a plurality of walls 130-134 that form a substantially enclosed waveguide within which a standing wave of microwave energy is generated by the microwave emitter 144. The walls 130-134 are formed from waveguide material known in the art that contains the microwaves within the waveguide 126. The roasting chamber 118 is positioned within the waveguide where the standing waves produces a high intensity microwave energy region (i.e., a microwave energy maximum). Such high energy regions are referred to herein as "high intensity microwave regions."

In addition to the use of a waveguide as discussed herein, the use of focused microwaves may be achieved by any one of several approaches. For example, in one embodiment, microwave energy may be focused by reflecting microwaves from a shaped surface that is highly reflective of microwave energy, so that radiation emitted from the microwave source is reflected towards the roasting chamber containing the coffee beans. Microwaves may be focused by reflecting off a surface such as a parabolic dish, a horn antenna, a hemispherical dome, etc. Alternatively, microwaves may be focused by means of a microwave lens.

In other embodiments, the focused microwaves may be achieved by use of a single-mode resonant microwave applicator. A single-mode resonant microwave applicator has the ability to create a standing wave pattern, which is generated by the interference of fields that have the same amplitude but different oscillating directions. This interface generates an array of nodes where microwave energy intensity approaches zero, and an array of antinodes where the magnitude of microwave energy is at a maximum. Single-mode resonant applicators are designed so that the distance of the sample from the magnetron is such that the sample can be placed at the antinodes of the standing electromagnetic wave pattern. Single-mode resonant applicators may be designed such that the standing electromagnetic wave pattern generates an array of one or more anti-node high intensity microwave regions where the magnitude of microwave energy is at a maximum. As further shown and described herein, these anti-nodes are generated at evenly spaced intervals (where there is a plurality) and are sufficiently stable and localized that a load can be accurately placed within the anti-node high intensity microwave region with predictable and repeatable results.

Referring again to FIG. 2, the single-mode resonant microwave applicator is comprised of a shorted rectangular waveguide 126 that forms a microwave cavity 128 comprising a metal tube of waveguide material having a generally rectangular cross section and one or more short-circuit walls 130 and 132 at the ends of the metal tube. It is contemplated that single-mode resonant microwave applicators may also be constructed of tubular or circular waveguides. In another embodiment, the microwave focusing device may be circular self-tuning single-mode resonant cavity (made by CEM Corporation, Matthews, N.C.). In a single-mode resonant microwave applicator, the superposition of the incident and reflected waves establish a standing wave pattern that is stable, well-defined in space, and has evenly and predictably spaced positions of energy maxima. These features enable a dielectric material, such as coffee beans, to be placed in one or more localized positions of maximum energy or concentrated electric field (referred to, herein, as a "high intensity microwave region") for optimum transfer of the electromagnetic energy to the dielectric material. In some embodiments, the single-mode resonant microwave applicator generates a standing microwave pattern comprising an electric field distribution of n half-wavelengths, where n is an integer. In some embodiments, n is greater than 1. In some embodiments, n=1, 2, 3, 4, 5, 6, 7, 8, 9 or 10, or greater.

In some embodiments, the single-mode resonant microwave applicator may be configured to generate a plurality of anti-node high intensity microwave regions. In some embodiments, as shown in FIG. 2, at least one of the one or more high intensity microwave regions is located within the roasting chamber. In other embodiments, the roasting chamber encompasses a single high intensity microwave region. In other embodiments shown and described herein, the roasting chamber encompasses a plurality of high intensity microwave regions. For example, the device may comprise a plurality of roasting chambers, wherein each high intensity microwave region is located within a single roasting chamber. In other embodiments, a single roasting chamber may span two adjacent high intensity microwave regions.

In some embodiments, the device may include two or more microwave energy sources such that the two or more microwave energy sources constructively interfere at approximately the same location within the roasting chamber.

Those skilled in the art understand that the choice of waveguide size depends on such considerations as operating frequency, power rating, component availability and cost. Various waveguide sizes commonly used for industrial microwave heating include 2450 MHz (S band) and 915 MHz (L band) include. For example, a WR284 (7.21 cm×3.40 cm) waveguide is often the preferred choice for 2.45 GHz operation at average power levels of up to 6 kW. Waveguides may be made of such materials as aluminum, copper, or stainless steel.

The length of such waveguides may vary, depending on the number of high intensity microwave regions desired in the waveguide. Microwave waveguide cavities may be designed to support any one of various $TE_{10}$ rectangular waveguide resonant modes, including $TE_{101}$, $TE_{102}$, $TE_{103}$, $TE_{104}$, $TE_{105}$, etc., which generate 1, 2, 3, 4 and 5 high intensity microwave regions, respectively. Additional high intensity microwave regions may be utilized advantageously in high volume manufacture of coffee beans. In accordance with certain embodiments of the invention, a roasting chamber for roasting coffee beans may encompass one or more high intensity microwave region within a single high intensity microwave region. In some embodiments, the roasting chamber encompasses a single high intensity microwave region. In other embodiments, the roasting chamber encompasses two high intensity microwave regions. In some embodiments, the entire waveguide comprises the roasting chamber, and coffee beans may pass through a plurality of high intensity microwave regions as they cascade down the length of the waveguide. In yet other embodiments, the devices of the present invention may include multiple outlets corresponding to each of the one or more roasting chambers. Thus, by using multiple roasting chamber and multiple outlets, one may significantly increase the quantity of roasted beans produced.

It is also understood that the design of waveguides may require appropriate isolators to allow microwave power to pass through in the forward but not reverse direction, so as to protect the microwave generator (i.e., the magnetron) from the damaging effects of reverse power. Alternatively, microwave devices may also include circulators, which do not absorb power and therefore require a separate "dummy" waveguide load connected to the circulator to absorb the reverse power.

The systems and devices of the present invention may also include impedance tuners, which couple microwave power to a load by matching the respective complex impedances between the load and the microwave power source.

In some embodiments, the present invention contemplates achieving enhanced heating uniformity in a single-mode applicator by reciprocating a standing wave inside the applicator. For example, the system may split the generate microwave power into two equal and coherent wave fronts. The two forward power wave fronts are then diverted through rotating phase shifters and then reflected back through the phase shifters before being routed to opposite ends of the applicator. The two coherent wave fronts converge inside the applicator to generate a pattern of standing waves. The phase shifters operate by rotating a thin dielectric slab inside the waveguide with its rotational axis in the plane of the electric field. When the slab, having low dielectric loss and high dielectric constant characteristics, rotates between positions perpendicular to and parallel with the waveguide centerline the phase shift alternates sinusoidally from near zero to maximum. Adjusting the slab geometry varies the phase shift amplitude. Rotating both phase shifters synchronously and exactly 90 degrees out of phase with each other will then cause a sinusoidal reciprocation of the standing wave pattern inside the applicator at constant amplitude.

In one particular embodiment, for example, the microwave cavity may be a single-mode resonant cavity furnace, comprising a rectangular waveguide designed to support $TE_{103}$ rectangular waveguide mode, and is constructed from WR284 copper waveguide (7.21 cm×3.40 cm). The guide wavelength at 2.45 GHz in WR-284 is $\lambda g=23.12$ cm and the total length of the furnace cavity is approximately/=1.5 $\lambda g=34.8$ cm. A bean loading inlet is located at approximately 17.50 cm from the source end (near the half-way point from each end), where the roasting chamber is located at a field maximum (a high intensity microwave region) at resonance.

As will be appreciated, those skilled in the art may construct and use other single-mode resonant cavity furnaces having different dimensions that are suitable for roasting coffee beans. Larger single-mode resonant cavity furnaces may be used, for example, to roast larger quantities of coffee on a commercial or industrial scale.

In addition, the present invention further contemplates that high intensity focused microwaves may be generated at a predetermined and stable location with the use of microwave focusing devices, such as microwave reflectors and lenses. For example, microwave reflectors may be used, having a parabolic or hemispherical shape, for focusing microwaves at a specific location.

As shown in FIG. 2, the bean roasting device 100 is contained within a housing 140 that houses and supports the various components. In order to subject the beans 12 within the roasting chamber 118 to a substantially equal dose of microwave energy, the roasting chamber 118 is positioned proximate the energy maxima of the standing wave of microwaves within the waveguide 126 that is generated by the magnetron 122. In addition, in this embodiment, the roasting chamber is comprised essentially of a cylindrical cup 118' that is spun or rotated relative to the waveguide 126 by a rotating shaft 142. The shaft 142 is supported by a bearing assembly 144 and is rotated by a motor 146 that is coupled to the shaft with a belt and pulley system 148. The cup 118' is rotated by the shaft 142 at a high rate (e.g., about 300 to 500 rpm or more) to cause the beans 112 to line the inside wall of the cup 118' due to centrifugal force. By having the beans 12 forming a single layer of beans along the inside wall of the cup 118' as the cup 118' spins, each bean 12 is exposed to substantially the same dose of microwave energy over time so that each bean 12 is roasted at the same rate to cause consistent roasting of the beans 12 throughout the batch.

A fan or blower 150 is coupled to an exterior wall of the housing 140 to cool the magnetron 122 and other electronic components, such as power supply transformer 154 and control circuitry 156. The bottom of the cup 118' includes ports that are small enough to prevent beans 12 from passing there through but that allow air from the blower to pass around the magnetron and through the cup 118'. Because the beans 12 emit water as they are roasted, the air from the blower 150 helps to dry the beans as they are roasted to prevent the resulting chaff from sticking to the inside of the cup 118'.

Roasting Chamber

As illustrated in the accompanying drawings, the system and devices of the invention includes a roasting chamber 218 for containing the coffee beans (not shown) while being heated. The roasting chamber 218 is configured to contain the coffee beans within a defined area that encompasses one or more high intensity microwave regions. In some embodiments, the microwave energy focusing device, such as waveguide 126, is configured such that at least a portion of one microwave energy maxima is located within the roasting chamber 218. In some embodiments, the roasting chamber 218 is constructed so as to permit or cause the beans to move within or through one or more high intensity microwave regions. In some embodiments, the roasting chamber 18 encompasses a single high intensity microwave region or a portion of a single high intensity microwave region. In other embodiments, the roasting chamber may encompass more than one high intensity microwave region, or a portion of more than one high intensity microwave region. In some embodiments, the roasting chamber is constructed of a material that is generally transparent to microwaves, such as Teflon, glass, plastic or ceramic, so as to allow the microwaves to pass through the roasting chamber walls and heat coffee beans disposed within the roasting chamber. The dimensions of the roasting chamber wall may also vary without significantly altering the microwave characteristics. By way of example, the roasting chamber wall may, for example, be anywhere from 1-15 cm, or in come embodiments from 2-10 cm, or in other embodiments from 3-5 cm. A suitable thickness would, for example, be approximately 4 cm.

In some embodiments, the devices of the present invention may comprise a plurality of high intensity microwave regions within a single microwave applicator. In such cases, the devices may also contain a plurality of multiple roasting chambers within the microwave applicator. It is further understood that a single roasting chamber may encompass more than one high intensity microwave region. The roasting chamber need not be concentric with a single high intensity microwave region. The roasting chamber may, for example, pass through the high intensity microwave region on one side of the roasting chamber while the other side of the roasting chamber is not located in a high intensity microwave region. Similarly, the roasting chamber may pass through all or part of a high intensity microwave region on one side of the roasting chamber, while passing through all or part of a high intensity microwave region on the other side of the roasting chamber. In such cases, the coffee beans may achieve a sufficiently high level of high intensity microwave heating as long as they are cycling through the roasting chamber and through the separate high intensity microwave regions fast enough that the heating effect of the high intensity microwave region averages out.

In some embodiments, the roasting chamber 218 for heating coffee beans may include a lower portion 230 and an upper portion 232. The lower portion 230 may be disposed within the waveguide cavity 128 at the location of focused microwave energy within the waveguide. The roasting chamber 218 is configured to be a spinning cup as previously described. The bottom surface 233 is provided with a plurality of apertures 234 through which air can pass as previously discussed with reference to FIG. 2.

Figure 3:
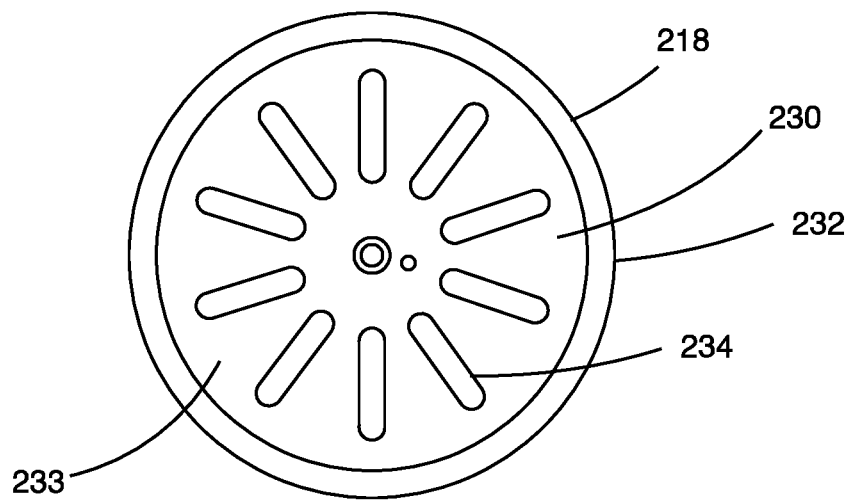
FIG. 3 shows a top view of a roasting chamber for roasting coffee in accordance with the principles of the present invention.
Figure 4:
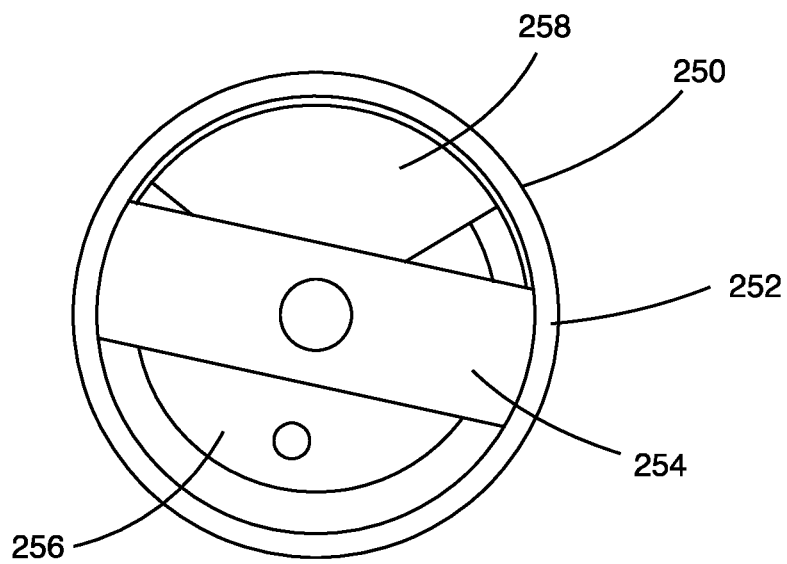
FIG. 4 shows a top view of another embodiment of a roasting chamber for roasting coffee in accordance with the principles of the present invention.
Figure 5:
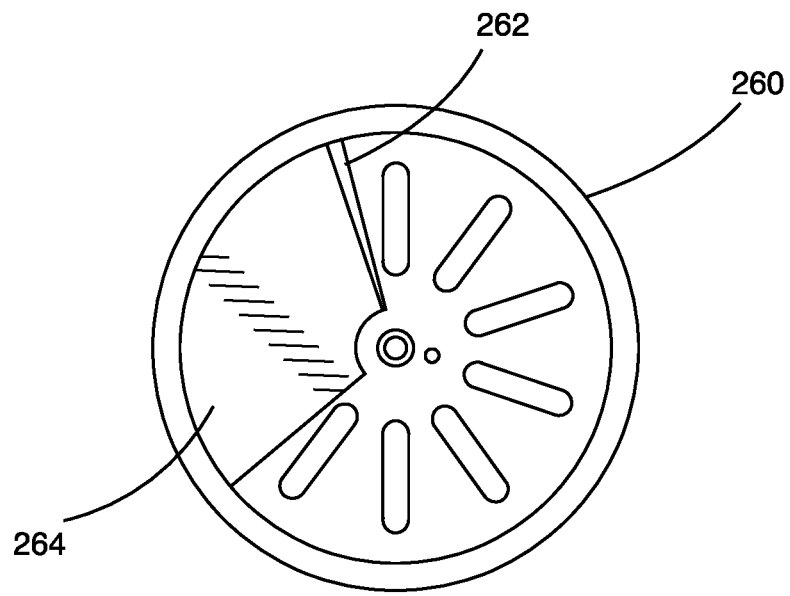
FIG. 5 shows a top view of yet another embodiment of a roasting chamber for roasting coffee in accordance with the principles of the present invention.

FIG. 4 is an alternative embodiment of a roasting chamber 250 according to the present invention. The roasting chamber 250 is comprised of a cylindrical cup 252 that is configured to be fixed in place relative to the waveguide. A rotating member 254, such as a bar or paddle is positioned proximate the bottom 256 of the cup 252. The rotating member 254 stirs the beans within the cup 256 as it spins at a relatively high rate (e.g., 300 rpm). The beans are thus rapidly circulated within the cup 256 while being roasted to expose substantially all of the beans of a particular batch to a substantially similar dose of microwave energy over time so as to cause all of the beans within the cup 252 to roast at the same rate and to cause each bean to substantially uniformly roast to prevent individual beans from having inconsistent roasting across the bean. As will be described in more detail, the bottom end 256 of the cup 252 defines an opening 258 to cooperate with a bean dispensing system once the beans have been roasted. Likewise, as shown in FIG. 5, a cup 260 having a configuration similar to the cup shown in FIG. 3 may include a bean dispensing opening 262 that is opened and closed with a rotating plate 264. The plate 264 is selectively movable between a first position in which the plate substantially covers the opening 262 to prevent beans from falling from the cup 260 to a second open position shown in FIG. 6 in which beans can be dispensed through the bottom of the cup 260.

Referring again to FIG. 2, the roasting chamber 118 may be connected to at least one air source, such as the air blower 150, for circulating air within the lower portion of the roasting chamber 118 and/or for passing air from the lower portion of the roasting chamber 118 to the upper portion of the roasting chamber 118 and out of the top opening of the roasting chamber 118.

In some embodiments, the roasting chamber 118 may be configured to allow coffee beans to move within and the through one or more high intensity microwave region within the roasting chamber. For example, the beans may be moved through the high intensity microwave region by airflow within the roasting chamber 118 generated by the air source 150, such as a blower 150.

Figure 7:
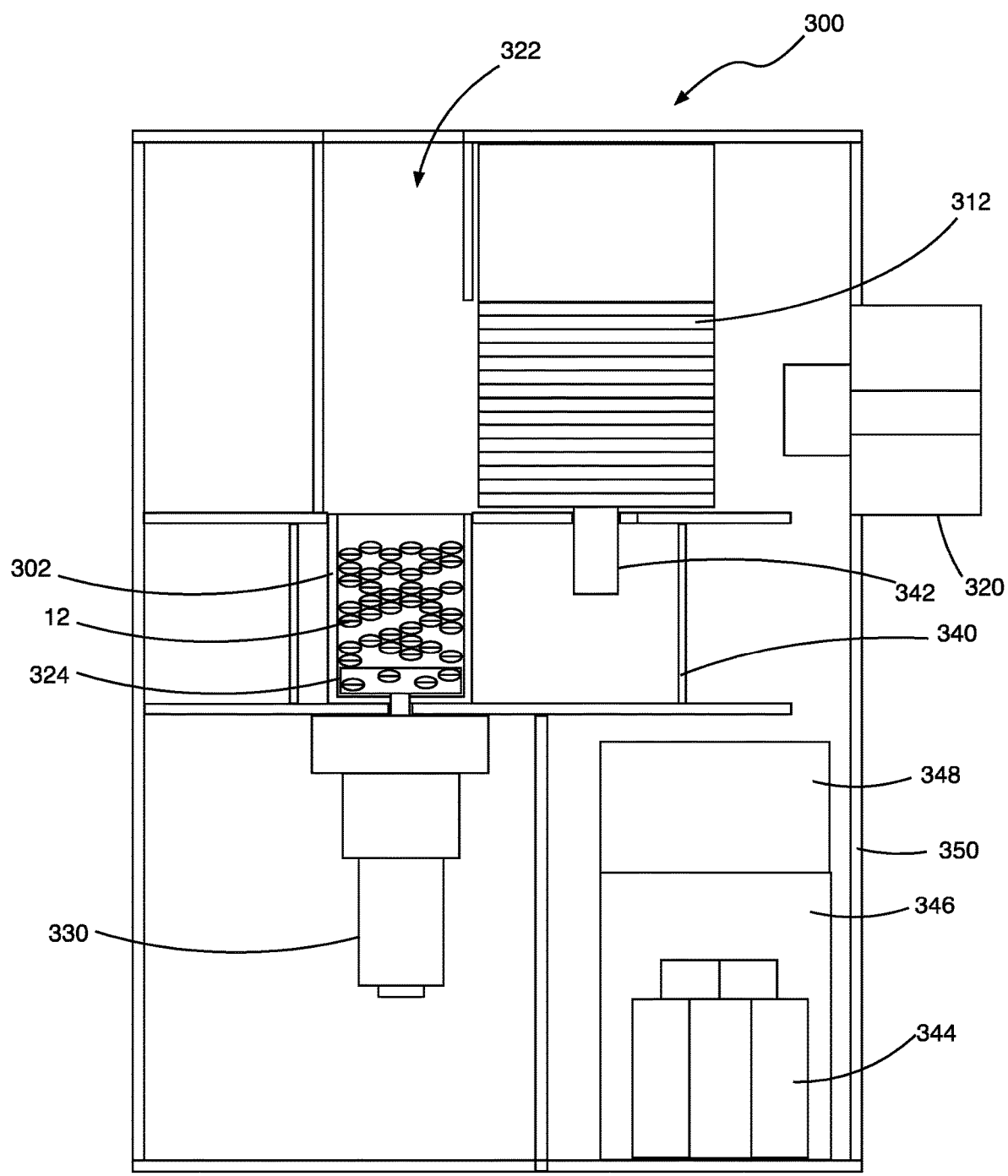
FIG. 7 shows a cross-sectional side view of yet another embodiment of an apparatus for roasting coffee in accordance with the principles of the present invention.

In another embodiment of the bean roasting apparatus of the present invention, generally indicated at 300, as shown in FIG. 7, the beans 12 may be moved through the high intensity microwave region by a rotating container 302 within which the beans 12 are disposed. In some embodiments, the beans 12 may be moved through the high intensity microwave region by a combination of airflow and a moving container. In some embodiments, the rotating container 302 may also include an inwardly facing lip, sufficient to prevent un-roasted coffee beans 12 from being removed from the container 302 by airflow or by centrifugal force of the rotating container.

As shown in FIG. 7, airflow is generated by an air source 320, which then passes around the magnetron 312 and into the container 302. The air flow from the blower 320 then draws smoke generated from the roasting process through the chimney or vent passage 322.

The roasting chamber 302 is stationary. A rotating member 324 is rotatably coupled to the cup 302 and positioned in a bottom portion thereof. The rotating member 324 is in the form of a stirring device, such as a rod or paddle that causes stirring or mixing of beans within the cup 302 during roasting. The stirring device may be formed from a material such as Teflon, glass, plastic or ceramic, so as to allow the microwaves to pass through the stirring device. Such stirring, as previously discussed, provides a substantially even dose of microwave energy to each bean 12 during the roasting period. Alternatively, the stationary cup 302 may rely on airflow to move the coffee beans within or through the high intensity microwave regions. Alternatively, as previously discussed, the roasting chamber may rotate or move so as to cause the coffee beans to move within or through the high intensity microwave regions. The air source may cause the beans to travel in a generally circular path in the roasting chamber while the beans are heated to cause more equal roasting of the beans. In addition, the air may be heated so as to further decrease the roasting times and to help the exterior of the bean to roast more rapidly as the inside of the bean is roasted with microwave energy. The same air source or an alternate air source may also be used lift roasted beans out of the roasting chamber. It will be appreciated that a bean has a much greater volume for the given mass (which essentially remains the same before and after roasting, less any dissipated moisture after roasting) and thus has increased drag compared to an un-roasted bean. The airflow through the roasting chamber may be configured to have sufficient velocity to carry a coffee bean out of the roasting chamber after the roasting process is complete. That is, the air flow through the bottom of the roasting chamber may be increased to carry out the roasted beans from the roasting chamber upon completion of roasting.

As further shown in FIG. 7, the rotating member 324 is rotated relative to the cup 302 with the shaft of electric motor 330. In this embodiment, the magnetron 312 is positioned above the waveguide 340 with the antenna 342 extending down into the waveguide 340. A capacitor 344, transformer 346 and other circuitry 348 are positioned within the housing 350.

Roasting Chamber/Container

The roasting chamber functions to circulate un-roasted coffee beans within and through one or more high intensity microwave region of high intensity microwave energy, so as to achieve rapid and uniform heating of the coffee beans. For example, the roasting chamber may comprise a container within which un-roasted coffee beans are disposed. The container may be cylindrical in shape or conical or funnel (frustoconical) in shape. In some embodiments, the container may be adapted to include one or more air inlets and an outlet. Airflow within and through the container may be utilized to move the coffee beans and achieve a more even distribution of heating of the beans as the movement within and through the one or more high intensity microwave regions results in a sufficiently high average heating of the coffee beans.

In other embodiments, the container may be configured to rotate so as to move the beans within or through one or more high intensity microwave region, with or without airflow, thereby achieving an average high intensity heating sufficient to cause rapid and uniform heating of the coffee beans. In some embodiments, the container may be configured to rotate so as to move the beans horizontally within or through one or more high intensity microwave region, while also being configured to include an air inlet and air outlet for vertical airflow, so as to selectively remove roasted beans from the container with the upward vertical flow of air after roasting. The rotation of the roasting chamber may also be used advantageously to hold coffee beans against the side wall of the roasting chamber by centrifugal force created by rotation of the roasting chamber, thereby increasing the required force of airflow to remove the bean before roasting, and permitting increased force of airflow to achieve selective removal of roasted beans from the container. Moreover, the rotation of the container further forces un-roasted beans to line up against the side wall, creating a trajectory of the beans at a constant radius through the one or more high intensity microwave region that is well-defined, so as to achieve a more uniform average high intensity heating of the beans.

The container may also be configured in the form of a cylinder or cone, with an inwardly facing lip at the top sufficient to prevent beans from exiting the container when the container is rotating. While rotation of the container forces coffee beans to the top by centrifugal force, the lip prevents beans from exiting the container.

In another embodiment, the roasting chamber may be substantially cylindrical in shape, with vertical side walls, with an inwardly facing lip at the top of the container. In embodiments utilizing vertical airflow to remove roasted beans, the inwardly facing lip is sized so as to prevent beans from exiting the container until roasting is complete.

Air Source

The roasting chamber may be connected to one or more air sources, such as a fan or air blower, for creating airflow within the roasting chamber and causing the coffee beans to move within the roasting chamber. In some embodiments, the device comprises one or more airflow inlets and an airflow outlet. The blower causes airflow to pass through the roasting chamber. In some embodiments, the blower is configured to cause airflow within or through the roasting chamber from a lower portion of the roasting chamber to an upper portion of the roasting chamber and through the airflow outlet of the roasting chamber.

The blower may be configured to cause airflow within the roasting chamber in a horizontal direction so as to cause the beans of coffee to circulate within and through the microwave high intensity microwave region. The roasting chamber may further comprise an air input in the side wall of the roasting chamber, wherein the horizontal of airflow comprises airflow input tangentially into the roasting chamber from the side wall of the roasting chamber at an angle generally perpendicular to the radius of the cylindrical roasting chamber. The blower or other air source may also be configured to cause airflow within the roasting chamber in an approximately circular path and move the coffee beans generally horizontally within the roasting chamber in an approximately circular path within and through the high intensity microwave region. In some embodiments, the roasting chamber is cylindrical and substantially circular in cross-sectional shape and the blower is configured to cause airflow within the roasting chamber in an approximately circular path and move the coffee beans horizontally within the roasting chamber in an approximately circular path. In some embodiments, an air source may also be provided to cause airflow within and through the roasting chamber in a vertical direction, so as to selectively lift roasted coffee beans upwardly and out of the roasting chamber. For example, the device may be configured with two air blowers, air blower and a second air blower. The blower may be configured to cause vertical airflow from a lower portion of the roasting chamber 18 upwardly to an upper portion 32 of the roasting chamber 18 and thereby selectively move the roasted coffee out of the roasting chamber when roasted.

In some embodiments, one or more air sources may be configured to create airflow in both a vertical and horizontal direction. For example, the blower may be configured to create airflow in an upwardly spiral direction. Alternatively, the airflow may be configured to form a vortex with the roasting chamber and/or outlet tube. Two separate air sources may be utilized to provide vertical and horizontal airflow. The airflow may be generated, for example, by a first blower and a second blower, wherein the first blower is configured to create airflow in a horizontal direction and the second blower is configured to create airflow in a vertical direction. Alternatively, single blower may be configured to provide airflow in both a vertical and horizontal direction by providing two separate air ducts from the blower to each of the air inlets. Where separate first and second blowers are utilized, each blower may be configured to independently provide a different rate of airflow for the vertical and horizontal airflows. For example, one or more of the blowers may be configured to independently provide sudden or increased airflow for the purpose of removing roasted beans of coffee from the roasting chamber. Similarly, the vertical and horizontal airflows may independently provide hot air or cold air.

In particular embodiments, the airflow has a flow-rate that will move a volume of beans through a high intensity microwave region sufficient to rapidly and uniformly heat the load of unroasted beans, while maintaining the unroasted beans within the high intensity microwave region without being expelled.

In addition, in another embodiment, heated airflow may be used to remove residual moisture from the roasted coffee beans.

Preheating

In accordance with another aspect, the present invention provides a heat source for preheating the one or more beans prior to being disposed within the roasting chamber. In some embodiments, the devices of the invention may include a heater for heating the airflow to be passed through the roasting chamber. The un-roasted coffee beans may be preheated by the heated airflow so as to increase the efficiency of the final microwave roasting. Accordingly, in some embodiments, the systems and devices may further comprise a heating element to cause heating of the airflow. In some embodiments, the air source or blower may include heating elements, which heat the airflow. The air being blown into the airflow chamber may, for example, between ambient room temperature of about 20° C. to about 232° C., or alternatively from about 50° C. to about 150° C., or alternatively from about 70° C. to about 180° C., or alternatively from about 80° C. to about 95° C. Thus, the coffee beans may be preheated, without resulting in roasting, when heated to a temperature less than 196° C. (385° F.). In other embodiments, the roasting chamber within which the coffee beans are dispose may itself be heated. In yet other embodiments, the coffee beans may be preheated within the storage container used to dispense the coffee beans into the roasting chamber.

In other embodiments, the systems and devices of the invention may also comprise a heat source for preheating the one or more beans prior to being disposed within the roasting chamber. For example, the beans may be preheated with a heat source selected from one or more of a flame, infrared heat, convection heat or heat from a resistive element.

In some embodiments, the devices of the invention further comprise a control module for controlling the temperature, flow rate, and flow path of the air.

Inlets/Outlets

Figure 8:
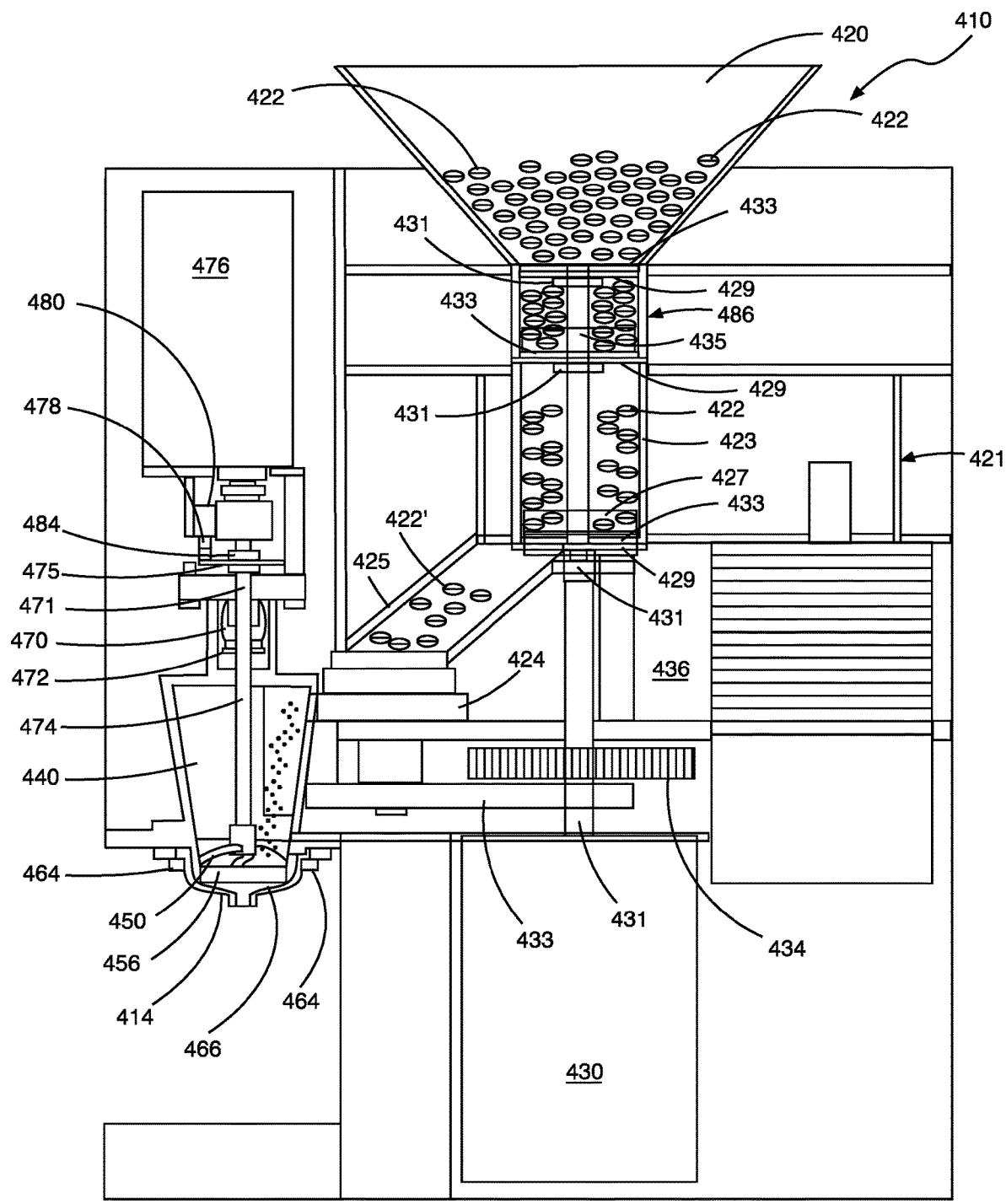
FIG. 8 shows a cross-sectional side view of yet another embodiment of an apparatus for roasting coffee in accordance with the principles of the present invention.

As shown in FIG. 8, in some embodiments a coffee bean storage container 420 is provided, which dispenses green coffee beans 422 through the portioning device 486 and into the roasting chamber 423. An inlet in plate 429 is configured to dispense a quantity of coffee beans into the roasting chamber 423. While shown above the roasting chamber, it is contemplated that the inlet may be located either on the side wall, the bottom or the top of the roasting chamber 423. FIG. 8 shows an inlet plate 429 into the top of the roasting chamber 423, allowing coffee beans 422 to be dispensed into the roasting chamber 423 by force of gravity. Coffee beans 422 may be dispensed into the roasting chamber from a storage chamber 420 that is connected to the roasting chamber 423 by means of a dispensing tube. The storage chamber 420 may be located above the roasting chamber 423, where it can dispense coffee beans to the roasting chamber by gravity, or may alternative be located to the side of or below the roasting chamber, where coffee beans would need to be dispense to the roasting chamber by means of a conveyor, lift, plunger or airflow. In some embodiments, the inlet plate 429 is configured to dispense the coffee beans 422 into the roasting chamber 423 in such a manner that coffee beans 422 circulating within the roasting chamber 423 do not reenter the dispensing tube. For example, the inlet plate may connect to the roasting chamber at an angle, such that coffee beans circulating in one direction bypass the inlet at an acute angle relative to the angle coffee beans enter the roasting chamber through the inlet and do not reenter the dispensing tube.

In some embodiments, the storage chamber 420 may also include a metering and dispensing device 486 for controlling the number of coffee beans being released into the roasting chamber 423 in batch mode. Alternatively, the metering and dispensing device 486 may control the rate of flow of coffee beans being released into the roasting chamber 423 for dispensing beans in a continuous mode. For example, the metering and dispensing device 486 may regulate the rate of flow to enable continuous feeding beans into the roasting chamber 423. Such a metering device includes, for example, a microphone for detecting the sound of a bean roasting or a temperature sensor for detecting bean temperature during a roast, coupled to a controller that regulates one or more process parameter, including air velocity, speed of circulating beans, input of new beans, output of roasted beans, microwave intensity, etc. The device of the invention further includes an outlet plate 429 at the bottom of the roasting chamber to selectively discharge roasted beans from the roasting chamber 423. An outlet tube 425 is coupled relative to the outlet plate 429 of the roasting chamber 423 to direct the roasted beans 422' dispensed from the roasting chamber 423 to a grinding mill 424.

The microwave devices of the present invention may also include any one of numerous sensory inputs that regulate the flow of coffee beans into the roasting chamber, the rate of airflow, the degree of preheating, etc. For example, the present invention contemplates the use of a microphone roast detector for sensing the sound created by the roasting bean and/or the frequency of the noise of roasting, coupled with the bean flow metering unit that dispenses additional quantities of coffee when the roasting ceases or the frequency of roasting falls below a selected threshold. In addition, such inputs may include sudden increased airflow to clean passageways of un-roasted beans or roasted beans that may occasionally adhere to surfaces.

The use of high field intensity high intensity microwave regions for roasting coffee beans further enables novel bean feed approaches. For example, in some embodiments, beans may be sprayed onto a strip of paper having an edible adhesive surface and the strip of paper with adhere beans may then be fed through the high intensity microwave region where the beans roast and release from the paper, or alternatively roast and remain adhered to the paper.

As further illustrated in FIG. 8, a combination coffee bean roasting, grinding, portioning, and pressing device 410 is constructed in accordance with the present invention with a mounted, detachable delivery filter 414. While such systems for grinding, portioning and pressing coffee are known in the art, the device 410 of the present invention also includes a bean roasting device 421 to uniquely allow raw coffee beans 422 to be freshly roasted for each batch of coffee prepared.

Briefly described, the roasting, grinding, portioning, and pressing device 410 includes a whole bean coffee storage container 420 for storage of coffee beans 422. Coffee grinding mills 424 are located under the roasting device 421 and storage container 420. The coffee beans 422 are ground in the mills and delivered from the grinding mills 424 into a ground coffee collection chamber 440. The ground coffee 438 passes from the collection chamber 440 through a motor-driven, rotating pressing tool 450 directly into the detachable delivery filter 414, which is temporarily attached to the device 410. Specifically, the shape and rotational motion of the pressing tool 450 causes the ground coffee 438 to be directed through the tool 450 and into the delivery filter 414.

The motorized pressing tool 450 is biased downwardly by a spring tensioning mechanism 470, which transmits force to the pressing tool 450 through a tensioning drive axle 474. The pressing tool 450 transmits this downward force onto the ground coffee 438 as the tool 450 rotates and incrementally and uniformly tamps the coffee into the delivery filter 414. The continual accumulation of compressed ground coffee 456 underneath the pressing tool 450 applies upward pressure against the spring tensioning mechanism 470 and causes the pressing tool 450 to rise upwardly as the tool rotates. When the pressing tool 450 has moved upward a predetermined distance, a shut-off switch 478 of a portioning control mechanism 480 is activated, completing the portioning process and ceasing the further introduction of ground coffee 438. The amount of ground coffee 438 that is compacted into the delivery filter 414 can be modified using a volume portioning adjustment mechanism 484 which changes the activation position of the predetermined shut-off switch in the portioning control mechanism 480.

The coffee bean storage container 420 is located in the upper right hand corner of the coffee roasting, grinding, portioning, and pressing device 410. The storage container 420 generally acts as a funnel for channeling coffee beans 422 to the coffee roasting device 421. The size and shape of the storage container 420 can be altered in numerous ways without affecting the functionality of the container 420 or departing from the scope of the present invention. The storage container 420 can hold a substantial amount of raw coffee beans 422, so that frequent refilling of the device 410 is not required during extended periods of continuous or near-continuous coffee roasting, grinding and brewing production. Further, the storage container 420 is preferably configured so that gravity alone is sufficient to direct the coffee beans 422 to the roasting device 421.

Raw coffee beans 422 enter the coffee roasting device 421 (configured similarly to the roasting device shown and described in FIG. 7). Once roasted, the roasted coffee beans are dispensed to the grinding mills 424, where the coffee is finely ground and then discharged to the left into the ground coffee collection chamber 440. In one embodiment of the present invention all parallel and conical (flat) grinding mills 424 (not shown, but known in the art) are utilized. In another embodiment, the grinding mills 424 employ two sets of grinding mills, one conical and one parallel (also not shown). This combination of conical and parallel sets of mills produces a highly beneficial and consistent particle grind uniformity for optimum release of flavor. Additionally, this combination of conical and parallel grinding mills 424 allows the device 410 to grind at a slow, uniform rate that helps prevent over-heating of the mills which can damage the coffee and harm its flavor. Further, grinding at this slower rate conserves energy and extends the burr life (period of time that the mill blades stay sharp) by a factor of three over traditional parallel mills.

As shown, the mill drive motor 430 is located in the lower right-hand corner of the coffee roasting, grinding, portioning, and pressing device 410. The motor drive shaft 431 extends upward from the top of the mill drive motor 430. A mill shaft 432 extends parallel to the motor drive shaft 431 and downward from the bottom of the grinding mills 424. The motor drive shaft 431 is connected to the mill shaft 432 by a mill drive belt 433, thereby connecting the mill drive motor 430 to the grinding mills 424.

An internal fan 434 is also connected to the motor drive shaft 431, just above the mill drive belt 433. The same motion created by the mill drive motor 430 which powers the grinding mills 424 also powers the rotation of the internal fan 434, since the fan is connected to the motor drive shaft 431. The simultaneous activation of the internal fan 434 in conjunction with the use of the grinding mills 424, acts to cool and prevent overheating of the internal components contained in, and associated with the grinding mills 424. The overheating of these internal components can result in damaging the flavor of the coffee and in the premature failure of the grinding mills 424 and associated components.

The internal fan 434 draws in air from an inlet duct 436 located directly above the fan.

After grinding, the ground coffee 438 is delivered into the ground coffee collection chamber 440. The ground coffee collection chamber 440 is frustoconical in shape, and tapers downward to the helical-shaped pressing tool 50 located in a bottom opening. Beneath the pressing tool 450 is a detachable delivery filter 414, which is temporarily attached to the device 410 by delivery filter attachment, mounts 464. Lining the inside of the delivery filter 414 is a filter container 66.

The pressing tool 450 undergoes a rotational motion when activated. When rotated, the helical shape of the pressing tool 450 provides a path for the ground coffee 438 to pass through the pressing tool and into the delivery filter 414. The helical-shaped pressing tool 450 includes two ramping fins.

The pressing tool drive motor 476 is located in the upper left-hand corner of the coffee grinding, portioning, and pressing device 410. The drive motor 476 is connected to the pressing tool 450 by a drive axle 474, and is responsible for powering the rotational motion of the pressing tool 450. The helical configuration and rotational motion of the pressing tool 450 directs the ground coffee 438 through the pressing tool 50 and into the delivery filter 14. A spring tensioning mechanism 470 is connected to the drive axle 474 and transmits a downward force onto the pressing tool 450 through the drive axle 474. Specifically, the drive axle 474 is slidably received with a rotor 471 that is located above the spring mechanism 470. The upper end of the spring tensioning mechanism 470 attaches to the lower side of the rotor 471. The lower end of the spring tensioning mechanism 470 attaches to a concentric disc 472 that in turn is affixed to the drive axle 474. In this manner, the spring tensioning mechanism 470 biases the drive axle 474, and thus the pressing tool 450 downward, via the attached concentric disc 472, while also allowing the rotation of the drive axle 474 by the drive motor 476 to be compensated for by the rotor 471. Although in the preferred embodiment, a spring is used to provide the tensioning force in the tensioning mechanism 470, any number of known biasing mechanisms could be utilized therein.

An extended disc 475 is also connected to the drive shaft 474 above the rotor 472. The disc 475 provides a substantially flat, circular surface that makes rolling contact with the roller shut-off switch 478 as the extended disc 475 is rotated by the drive motor 476, via the drive shaft 474. The roller shut-off switch 478 activates when the switch has been elevated a predetermined distance (by the extended disc 75).

The delivery filter 414 is temporary attached to the device 410 by placing the filter over the depending pressing tool 450 and into matable contact with the attachment mount 464. The delivery filter 414 is then rotated 90 degrees locking the filter 414 into secured engagement with the attachment mount 464. The filter 414 is then removed after being filled with a portioned and compacted amount of ground coffee 456, by rotating the filter 90 degrees in the opposite direction.

To produce roasted, ground, portioned, and compacted coffee using this device 410, the operator places coffee beans 422 in the storage container 420, attaches a portable delivery filter 414 to the attachment mount 464, and turns on the machine 410. Turning on the machine 410 activates the roasting device 421, grinding mills 24 and the rotating pressing tool 50. The roasting device 421 roasts the raw beans 422, mills grinds the whole beans 422 into ground coffee 438, which is directed into the collection chamber 440, the pressing tool 450 at the bottom the chamber 440 and into the delivery filter 414. The pressing tool 450 transmits downward force from the spring tensioning mechanism 470 onto the ground coffee 438 in the delivery filter 414 as ground coffee 438 passes underneath the rotating pressing tool 450. The combination of the helical configuration of the pressing tool 450, the rotational motion of the pressing tool 450, and the downward force being applied onto the ground coffee 438 by the pressing tool 450, synergistically act together to incrementally and substantially uniformly tamp the ground coffee 438 into the collection filter 466 within the delivery filter 414.

This uniform incremental tamping is produced by the helical pressing tool 50 using a single continuous rotational motion and substantially constant downward force. In this manner, incremental tamping of the coffee is performed as the collection filter 466 is filled from the bottom to the top, producing a compacted coffee "puck" 456 of substantially uniform density. The continual incremental compaction produced by the helical pressing tool 450 avoids the density gradient variations typically found in coffee pucks produced using traditional tamping techniques, which detract from optimal coffee flavor creation. Additionally, the density of the compacted coffee 456 produced by this device can be modified by altering the strength of the spring or other biasing device utilized in the tensioning mechanism 470.

The roasting device 421 is positioned below a bean portioning device 486 that selectively receives beans 422 from the container 420. The bean portioning device 486 is sized to receive a quantity of beans 422 from the container 420 sufficient for a single batch of roasted coffee beans for one serving of coffee. The portion of beans 422 in the bean portioning device 486 are then deposited in the roasting chamber 423 of the bean roasting device 421. After roasting, the roasted beans 422' are passed through a chute 425 to the grinding mill 424.

Figure 6:
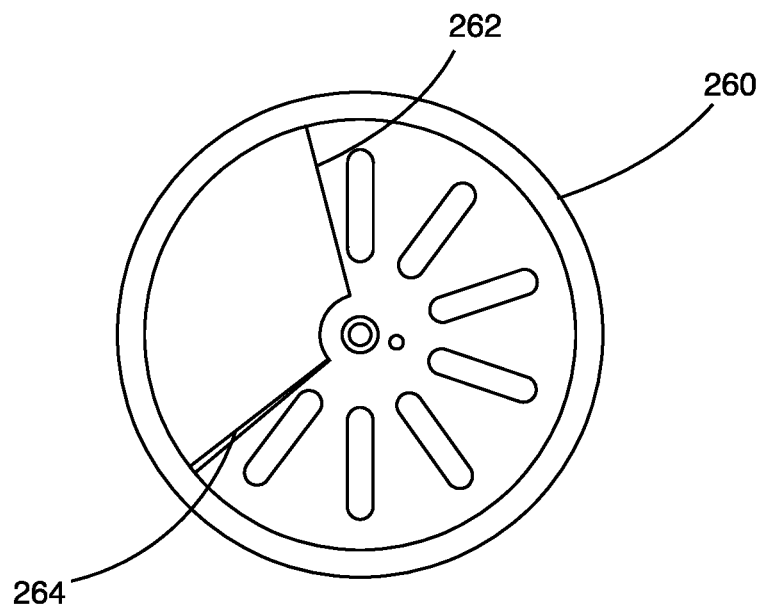
FIG. 6 shows a top view of the roasting chamber for roasting coffee show in FIG. 5.

The shaft 431 of the motor 430 is operably coupled to each of the fan 434, roasting device 421 and portioning device 486. In a forward direction of rotation, the shaft 431 is rotated by the motor at a relatively high RPM, such as about 300 RPM to cause adequate air flow through the system by the fan 434 and to spin the mixing device 427 so as to rotate the beans 422 within the roasting chamber 423 during the roasting cycle. During the roasting stage, beans 422 are prevented from entering the portioning device 486 or the roasting chamber 423. After roasting, the shaft 431 is rotated in an opposite direction, which may be at a relatively slow RPM, such as about 60 RPM. Each interface between the container 420 and the portioning device 486, between the portioning device 486 and the roasting device 421 and between the roasting device 421 and the grinding mill 424 includes a dispensing plate 429 that is operably controlled by the shaft via a clutch mechanism 431. The dispensing plate 429 is generally circular with an opening spanning approximately ⅓ of the plate. The bottom end plates 433 of each of the container 420, portioning device 486 and roasting chamber 423 include an opening also approximately equal to ⅓ of the end plate 433. When the shaft 431 is spinning in a forward direction, each dispensing plate 429 is positioned so that the dispensing plate covers the opening of the respective bottom plate 433 and the shaft 431 is allowed to freely rotate relative to the end plates 433. In the opposite direction, however, the clutch mechanism 431 causes the dispensing plate 429 to rotate relative to the end plate 433 to align the opening in the end plate 433 with the opening in the dispensing plate 429 thus allowing beans to move between respective components. By offsetting the relative angular positions of the openings of the end plate 433 of each component, dispensing from the container 420 to the bean portioning device 486 can occur while the end plate 433 of the bean portioning device is closed. Likewise, after the beans are portioned in the portioning device 486, the plates between the container 420 and the bean portioning device 486 are closed and the plates between the bean portioning device 486 and the roasting chamber 423 are opened. Rotation of the shaft 431 in this position causes a dispensing bar 435 to push the beans into the opening. At this stage, the plates between the roasting chamber 423 and the grinding mill 424 are in a closed position to prevent the raw beans from leaving the roasting chamber 423 until after the roasting stage is completed. Embodiments showing the opening and closing of the openings in the plates as described herein are illustrated in FIGS. 5 and 6. As such, a process for roasting, grinding and brewing coffee can be achieved with the device 410 according to the present invention.

It is further contemplated that water for brewing the coffee cold be dispensed through the roasting chamber and into the brewing portion of the machine. This would be beneficial in cleaning out the roasting chamber after each roast to remove oils and chaff produced during roasting that may remain in the roasting chamber after each roast. Similarly, water from the espresso machine rinse cycle could be used to clean the roasting chamber.

In another embodiment, the coffee beans are roasted and espresso is made in a continuous process rather than in single servings. That is, coffee beans are conveyed along a conveyor belt through a roasting device, through a grinding device and then to water extraction. Thus, each bean or at least as small cluster of beans proceeds through the process on a micro scale. A person can then make as small or large of an espresso as desired. In addition, the process can be changed throughout the course of making an espresso. For example, one could starting with a light roast and slowing water extraction and then move to a heavy or darker roast with a light water extraction.

Vending Machines

The systems, devices and methods of the present invention may also be utilized to provide coffee vending machines, for rapid, automated and convenient dispensing of coffee at entertainment venues. For example, such automated vending machines may be configured to dispense a specified quantity of coffee to a purchaser upon activation of a purchase transaction via a customer interface, which is used to initiate the transaction by a purchaser. The purchase transaction may comprise payment by coin, paper bill, a debit card or credit card, pre-paid credit/debit card or gift card, internet banking service, token, near-field transmission card (radio frequency identification, or RFID), QR code, or the like. Thus, the device may include any suitable customer interface capable of interacting with such payment methods. Such customer interface may include, for example, a magnetic card reader, a near-field reader, a QR reader, or a keypad to manually enter credit card information. The purchase transaction may comprise electronic payment activated by a mobile device. Any suitable method for initiating such a purchase transactions is contemplated herein. The machines may, for example, be connected to the Internet, either by wireless or telephone cable signal, with encrypted transactions being activated by the purchaser on demand, and dispensing of product upon receipt of payment.

The vending machines contemplated by the present invention will be highly efficient in dispensing coffee to purchasers as a result of the rapid roasting and the unique physical properties of the resulting coffee. The relatively small size of the devices disclosed herein are particularly suitable for vending machines, which may be moved from one venue to another, thus avoiding the need for dedicated machines that remain at a venue permanently, even when no activities at the venue are taking place.

The significantly increased roasting rates achieved through the devices and methods of the present invention further expand the utility of coffee roasting machines in commercial, military and humanitarian applications. For example, the high intensity microwave region roasting machines can produce significantly larger quantities of coffee on demand, within less than 20-30 seconds, such that it can keep up with customer demand at large entertainment venues, thereby increasing total sales. Moreover, the relatively small size of the high intensity microwave region coffee roasting machines makes the machines significantly more portable, such that a single machine can be moved from one venue to another venue, thereby achieving a higher utilization of a given machine.

The microwave roasting machines disclosed herein may be operated from any suitable power source, include a standard electrical outlet. Portable machines may be powered either by standard electrical outlets available at the venue source, or may be operated by generator, battery, solar power, automotive power, or other available power supply. Battery or solar powered devices may be useful, for example, when the device is used in remote locations where standard electrical power source is unavailable. It is understood by those skilled in the art that battery or solar powered devices may require modifications to the electronics system that regulates operation of the device.

The vending machines disclosed herein may also comprise a high capacity storage chamber, suitable for storing sufficient quantities of beans to be dispensed during high demand or for large groups of individuals. Vending machines may also include, for example, metering devices for controlling the quantity of beans dispensed into the roasting chamber.

Methods

Figure 9:
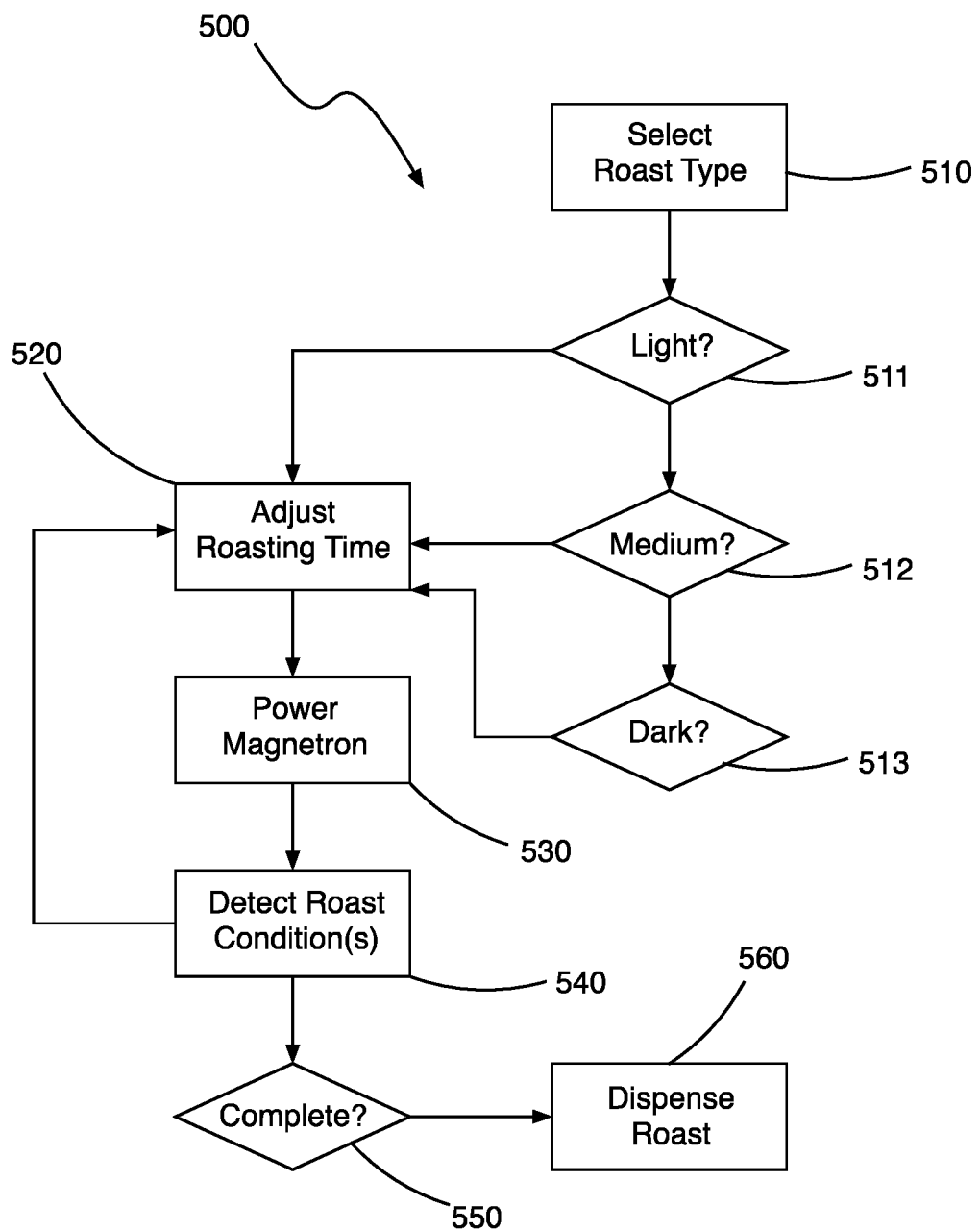
FIG. 9 shows a schematic block diagram of a method of roasting coffee in accordance with the principles of the present invention.

The improved system and method of making coffee heats coffee beans with microwave electromagnetic radiation by creating high intensity microwave regions within a roasting chamber. The coffee beans are heated in the high intensity microwave regions until they roast to a desired and preselected degree. As shown in FIG. 9, a method for roasting coffee beans 500 according to the present invention includes the steps of selecting a roast type 510, adjusting roasting time 520 according to the desired roast type, powering the microwave emitter 530, detecting roast conditions 540 and dispensing the roasted beans 560 once roasting is complete 550.

For the selecting the roast type 510, the system of the present invention allows one to select a light roast 511, a medium roast 512 or a dark roast 513. Because of the ability to precisely control the roast produced according to the present invention based on time of the roasting alone, it is contemplated that more precisely defined roasts can be selected, such as for example, a city roast, a full city roast, a French roast, a Spanish roast, etc.

For detecting roast conditions 540, various sensors may be incorporated into the system. For example, an optical sensor could be used to determine bean color as an indication of the roast level. Likewise or in addition to, an infrared sensor could be used to determine bean temperature as an indication of the roast level. Further, a sound sensor could be used to determine time to first crack and time to second crack to more accurately determine the roast. Furthermore, by determining the time to first crack and/or second crack, the roasting time can be adjusted based on the rate in which the beans are actually being roasted. For example, roasting times can be affected by a variation in the quantity of beans within the roasting chamber, the elevation at which the roasting is occurring, humidity in the ambient air, etc. By detecting roasting conditions in real time with one or more of the sensors herein described, the system 500 can adjust the roasting time 520 to produce more accurate roasts based on the roast selected 510 by the user.

Figure 10:
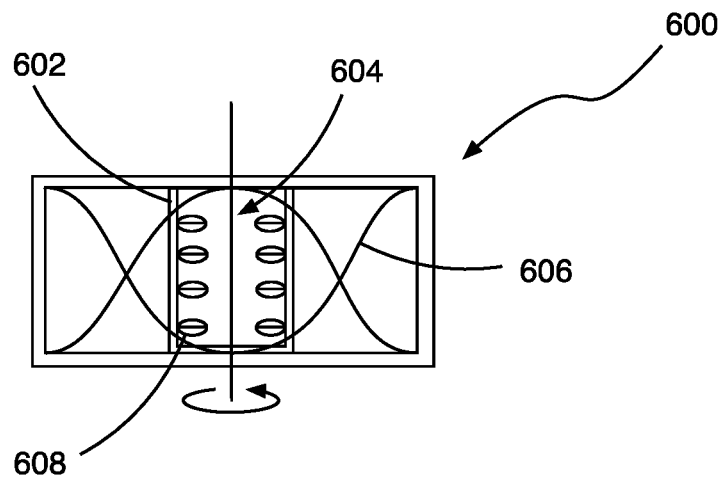
FIG. 10 shows a side view of a wave guide and roasting chamber in accordance with the principles of the present invention.

In one aspect, the present invention also contemplates novel methods for making coffee. In one embodiment shown in FIG. 10, a system 600 is provided that comprises the steps of passing electromagnetic microwave radiation through a roasting chamber 602 and maintaining at least one antinode 604 of at least one microwave 606 at a substantially fixed location within the roasting chamber 602. The coffee beans 608 are heated with the microwave radiation at approximately the location of the one or more antinode 604.

Figure 11:
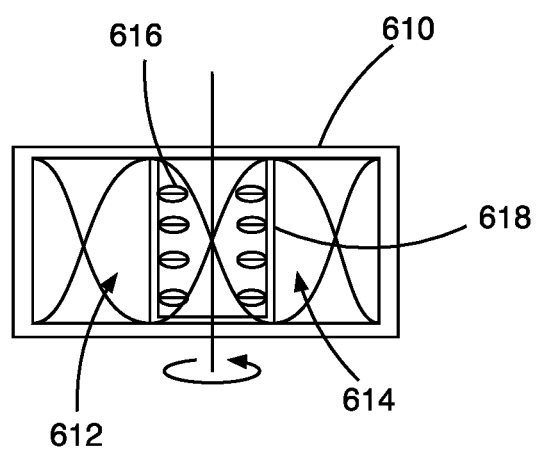
FIG. 11 shows a side view of an alternative embodiment of a wave guide and roasting chamber in accordance with the principles of the present invention.

In yet another aspect as shown in FIG. 11, the present invention provides a method for roasting coffee beans, comprising generating in a single-mode resonant microwave applicator 610 a standing microwave energy field comprising an array of one or more anti-node high intensity microwave regions 612 and 614, and subjecting coffee beans 616 to the microwave energy in the one or more high intensity microwave regions 612 and 614, sufficient for the coffee beans to achieve a uniform distribution of microwave energy heat to cause the coffee beans to roast. The roasting chamber 618 encompasses the one or more high intensity microwave regions 612 and 614. The coffee beans are moved, as indicated by the arrow through the microwave high intensity microwave regions 612 and 614 within the roasting chamber 618 to achieve a highly uniform distribution of microwave energy heat until roasted.

Figure 12:
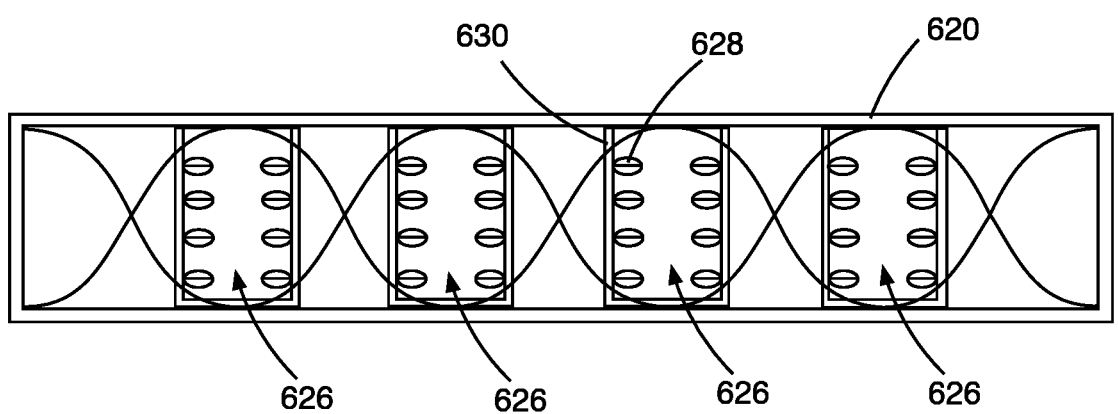
FIG. 12 shows a side view of another alternative embodiment of a wave guide and roasting chamber in accordance with the principles of the present invention.

As shown in FIG. 12, the present invention provides a method for roasting coffee beans, comprising generating in a resonant microwave applicator 620 a standing microwave energy field comprising an array of anti-node high intensity microwave regions 622-626, and subjecting coffee beans 628 contained within one of a plurality of roasting chamber 630 to the microwave energy in a respective high intensity microwave region 622-626, sufficient for the coffee beans to achieve a uniform distribution of microwave energy heat to cause the coffee beans to roast. Each roasting chamber 630 is positioned at least partially within a respective one of the high intensity microwave regions 622-626. The coffee beans are moved through the microwave high intensity microwave regions 622-626 within the roasting chamber 630 as herein described with respect to other embodiments shown and described herein to achieve a highly uniform distribution of microwave energy heat until roasted.

The methods and devices of the present invention are surprisingly effective in rapid and highly complete roasting of coffee beans. Indeed, it has been discovered that the above methods and devices produced coffee produced coffee having unique and unexpected physical properties. While it has previously been believed by those of skill in the art that roasting coffee too quickly or brewing coffee from freshly roasted beans is disadvantageous because of the amount of $CO_2$ still contained in the beans, the coffee beans roasted in accordance with the principles of the present invention have achieved surprising results that appear to show superior and/or at least comparable crème while maintaining desired oils from the beans in the brewed coffee, as compared to coffee brewed from the same coffee beans that have been roasted using traditional methods. In traditional coffee roasting techniques, the coffee beans are roasted for a significantly longer period of time (e.g., 10-13 minutes) compared to coffee beans that are roasted in accordance with the principles of the present invention (e.g., 30-40 seconds). As a result, oils from the coffee beans roasted by traditional methods have time to seep from the coffee beans That is, despite the retention of oil in the freshly roasted beans of the present invention, which is the crème content and quality remains at least as high as that found when brewing coffee beans roasted by traditional methods.

Yet another surprising result was the discovery that coffee produced using the methods and devices of the present invention resulted in coffee that was more completely roasted. Thus, the methods and devices of the present invention improved roasting efficiency (i.e., the completeness of roasting of individual beans).

As previously discussed, green coffee beans can be completely roasted in a matter of seconds in accordance with the present invention. This allows for use of freshly roasted beans to make coffee once the beans are ground. For example, in preliminary testing using a roasting device of the present invention, 20 mL batches of green beans 20 mL of beans were roasted for various times to produce roasts of varying degrees. The following table provides the results:

| Time to 1st Crack | End Time | Roast |
| --- | --- | --- |
| 18 | 30 | Drying |
| 17 | 35 | Cinnamon |
| 17 | 40 | New England |
| 13 | 45 | City |
| 16 | 50 | American |
| 18 | 40 | American |
| 17 | 40 | American |

In these preliminary tests, a complete roast, such as a City or American Roast, were achieved in as little as about 40 seconds. Improvements to the roasting device of the present invention, however, have resulted in efficiencies that allow for a cinnamon roast in about 15 seconds and a dark Spanish roast in about 30 seconds. For example, 20 mL of green coffee beans were roasted with a roasting device according to the present invention with the following results:

| Time to 1st Crack | End Time | Roast |
| --- | --- | --- |
| 18 | 32 | City |
| 22 | 30 | City |
| 22 | 31 | City |
| 20 | 30 | American |
| 18 | 29 | American |
| 19 | 28 | American |
| 20 | 26 | New England |
| 19 | 25 | Cinnamon/New Eng. |
| 19 | 24 | Cinnamon |
| 18 | 33 | Full City |
| 20 | 34 | Full City |
| 20 | 32 | City |

Starting with green coffee beans at room temperature (e.g., 72° F.), the drying phase is reached at a bean temperature of 329° F., a Cinnamon Roast is reached at a bean temperature of 385° F., a New England Roast is reached at a bean temperature of 401° F., an American Roast is reached at a bean temperature of 410° F., a City Roast is reached at a bean temperature of 426° F., a Full City Roast is reached at a bean temperature of 437° F., a Vienna Roast is reached at a bean temperature of 446° F., a French Roast is reached at a bean temperature of 464° F., an Italian Roast is reached at a bean temperature of 473° F. and a Spanish Roast is reached at a bean temperature of 482° F. If the roast is allowed to progress beyond a Spanish Roast, the coffee will fully carbonize and eventually combust. Thus, it is important for the coffee roasting system of the present invention to be time and/or sensor controlled to prevent over-roasting of the coffee beans that could result in combustion. Moreover, it is important for the coffee roasting system of the present invention to be made of heat resistant materials so as to prevent damage to the components of the coffee roasting system as a result of the high bean temperatures during roasting. Based on the size of the batch of green beans, the roasting times may vary slightly due to the thermal load and other factors, such as elevation, humidity, ambient temperature, etc. However, consistent results have achieved for a full batch of beans of sufficient quantity for filling a typical porta filter with ground, roasted coffee beans with drying of the beans in about 19 seconds, cinnamon roast in about 23 seconds, American roast in about 26 seconds, full city roast in about 30 seconds, French roast in about 34 seconds and Spanish roast in about 38 seconds.

Turning now specifically to the drawings, FIG. 1 shows a coffee roasting system 10. In order to roast coffee, beans are dispensed into a roasting chamber 18. This may be done from a storage container 66 through a dispensing tube 68 and through an inlet 69. The coffee beans are subjected to microwave energy emitted from an antenna 24 connected to a magnetron 22. The microwave energy is contained in a waveguide 28 to establish a substantially standing wave so that the microwave energy has nodes of minimal energy and anti-nodes of maximal energy. The roasting chamber 18 is disposed about the anti-node so that the coffee beans disposed therein are exposed to high levels of focused microwave energy.

The focused microwave energy quickly heats the coffee bean and causes it to "crack." In accordance with one aspect of the present invention, it has been found that rapid heating of the bean can actually provide improvements. By circulating the coffee beans in the roasting chamber, the beans revolve through the area within and around an anti-node, and may be heated more uniformly within the individual beans and as a group. This, in turn, allows the coffee beans to roast to a greater degree.

The movement of the coffee beans in the roasting chamber 18 can be accomplished by a variety of methods. These may include forced air circulation, rotating the roasting chamber itself or using a stirring rod or other spinning device within the roasting chamber, which may be apparent in light of the present disclosure. As shown in FIG. 2, the movement of the coffee beans may be accomplished by a spinning cup. As shown in FIG. 7, the movement of the coffee beans may be accomplished by a stirring device 324 within the cup 302. Alternatively, the movement of the coffee beans may be accomplished by a combination of a spinning cup and a stirring rod, with the stirring rod having one or more upwardly extending arms adjacent the side wall of the cup to cause mixing of the beans within the cup. In such an arrangement, the stirring rod may be stationary with the cup spinning around the stirring rod. Alternatively, the stirring rod may rotate in a direction opposite the spinning cup to cause the same tumbling effect of the beans within the cup while being roasted to cause each of the beans to be subjected to substantially the same average does of microwave energy during a roasting cycle. Also, a flow of air through the cup to circulate the beans within the cup may be provided in addition to or alternatively to either the spinning cup or the stirring rod as described herein. By directing the flow of air tangentially to the interior of the cup, a vortex of air is generated within the cup to move the beans in a generally circular path within the cup.

It is also contemplated that heating elements may be disposed along the flow of air from the air source to preheat the air. It has been found that preheating the air can improve bean roasting, especially on the exterior of the bean. The heating element is advantageous as it provides additional control over the heating gradient occurring with the coffee beans. The microwave energy heats the water contained in the beans, while the heated air can be used to facilitate exterior roasting within a desired window of time.

Figure 13:
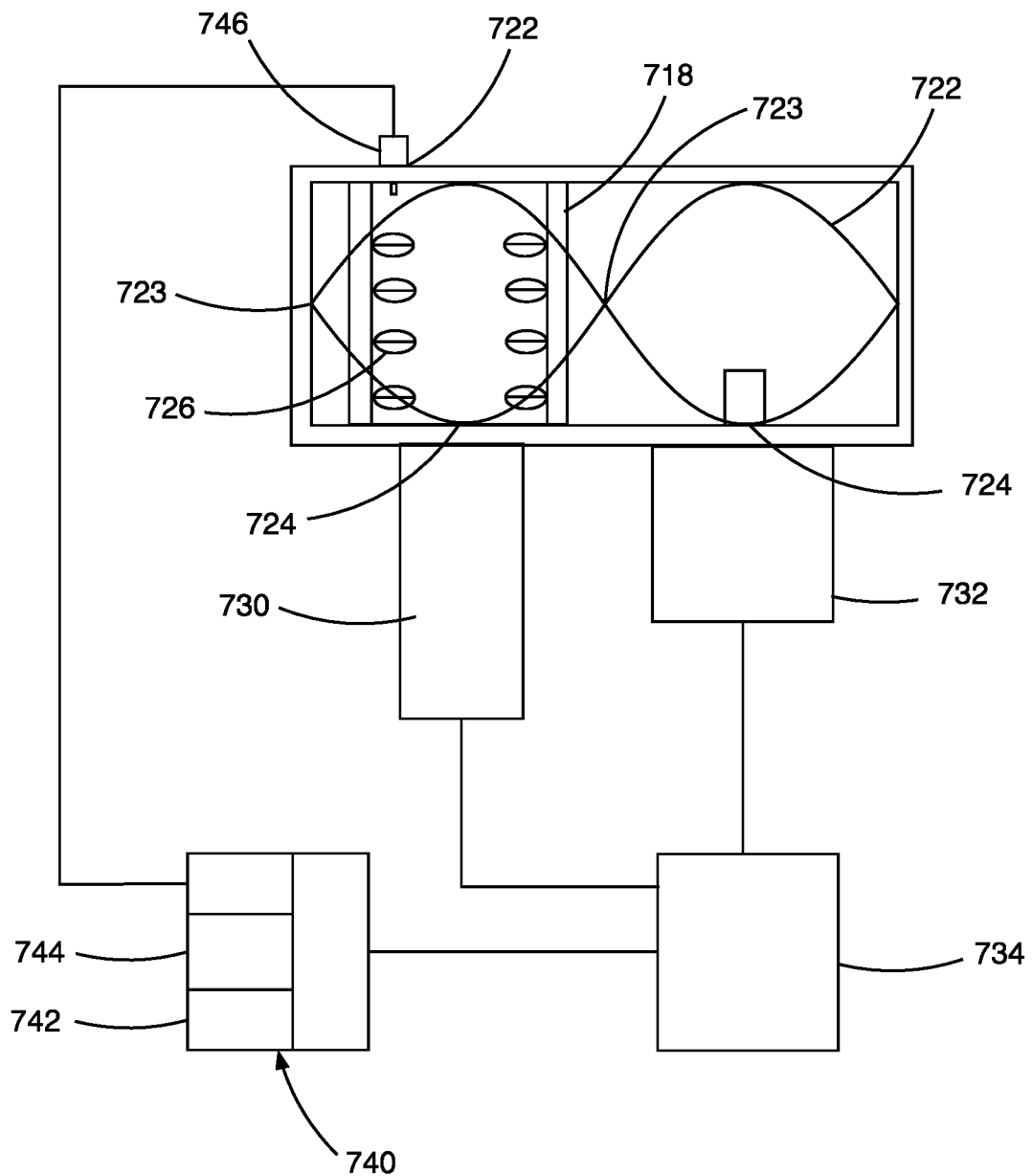
FIG. 13 shows a side view of yet another embodiment of an apparatus for roasting coffee in accordance with the principles of the present invention.

The airflow can also be used to regulate humidity. For example, the air flow reduces residual moisture within the roasting chamber that may cause chaff from the roasted beans to stick to the sides of the chamber. The air flow through the roasting chamber reduces moisture deposits on the walls of the roasting chamber and also can be used to carry the chaff out of the roasting chamber and collected by a filter or other collection device Turning to FIG. 13, there is shown a roasting chamber 718 and a wave representing focused microwave energy 720 as may be achieved from a wave guide 722. The microwave energy 720 has nodes 723 of minimal energy and anti-nodes 724 of maximal energy. At a frequency of 2.45 GHz, the wavelength is approximately 12.2 cm. Thus, the nodes 723 are spaced apart approximately 6.1 cm. Likewise, the anti-nodes 724 are spaced apart a similar distance. In order to contain the un-roasted beans 726 in the area of the anti-node 724 and subject them to maximal energy, the coffee beans are preferably contained in the area most closely surrounding the anti-node 724. Thus, the diameter of the roasting chamber 718 may be less than one-half of the wavelength of the microwave energy, or alternatively about one-quarter of the wavelength, such as between about 2.5 and 3.1 cm (1 and 1.25 inches) for 2.45 GHz. As the beans revolve and pass through the anti-node 724, the beans more evenly heat.

The roasting chamber 718 is coupled to motor 730, which may be used to rotate the chamber or to rotate a stirring device as previously described to move the beans 726 relative to the microwave energy field 720. Both the motor 730 and the microwave emitter 732 draw power from an electrical power source 734. In addition, the motor 730 and the microwave emitter 732 are controlled by a controller 740. The controller includes a processor 742 for executing instructions in firmware or software contained in memory 744 that control the length of time of the roast depending on user selection, or in the case of an espresso machine, to produce a proper roast for making espresso. The controller 740 may also be in communication with one or more sensors 746 to detect roast status during the roast to more accurately produce a specific roast.

Referring again to FIG. 2, to prevent the un-roasted beans 12 from escaping from the spinning cup 118, an annular lip 151 or a series of projections may be disposed adjacent the top of the spinning cup. The lip 151 is preferably sized to contain un-roasted beans. Thus, for example, the lip 151 may extend between about 1-10 mm. Unroasted beans will run into and be held in the roasting chamber by the lip.

While discussed as being moved by airflow, a rotating mixing device and a spinning cup, it will be appreciated that other means exist for spinning the coffee within the roasting chamber so as to circulate the beans about the anti-node. Such other means are intended to be covered by the appended claims.

While FIG. 2 shows one embodiment of a microwave wave guide, which can be used in accordance with the principles of the present invention, it will be appreciated that other types of wave guides may be used. For example, an alternative microwave waveguide applicator for roasting coffee beans may includes a magnetron, an antenna and a wave guide, which is generally circular, and a roasting chamber in which the coffee beans may be disposed.

Figure 14:
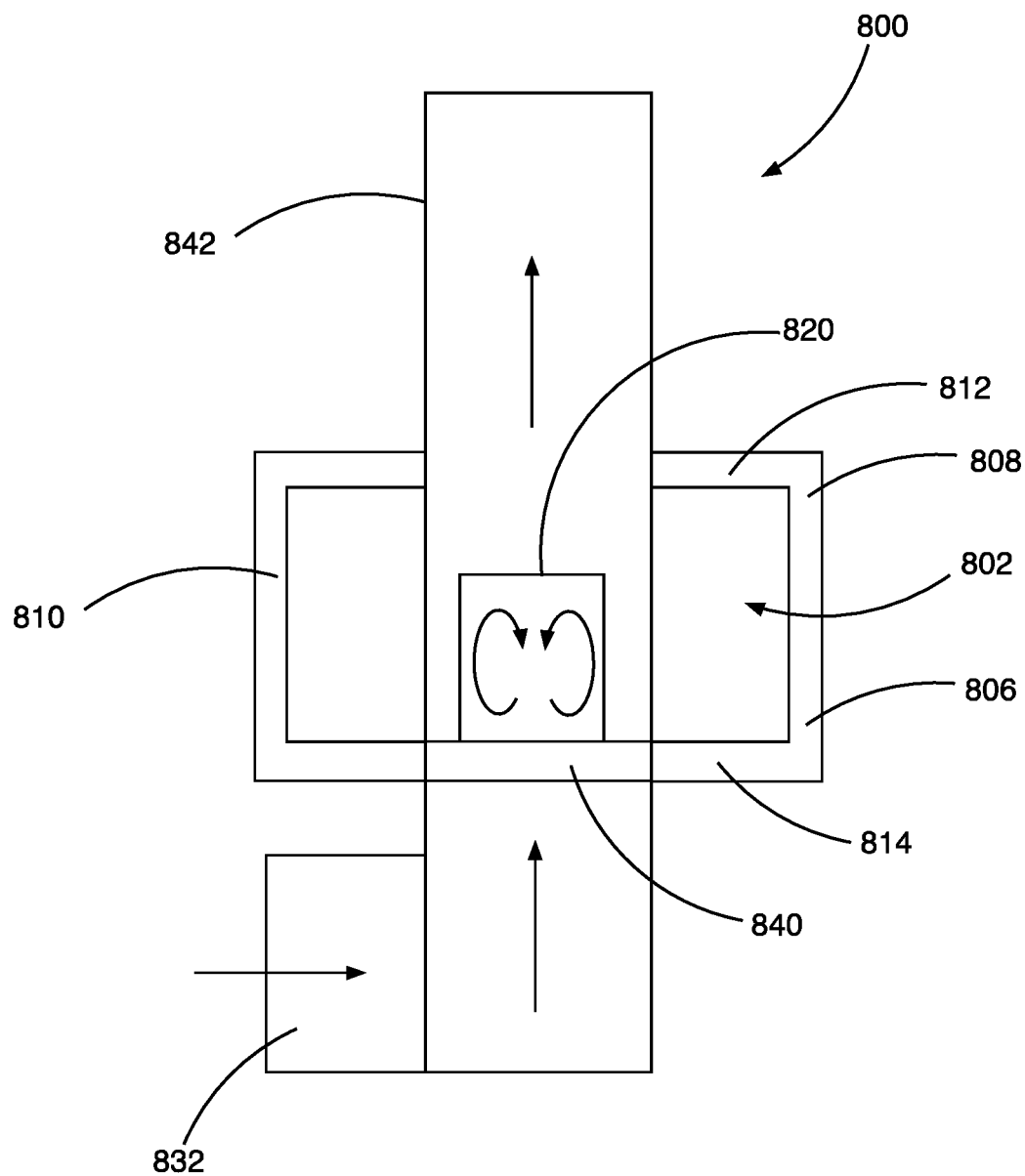
FIG. 14 is a schematic side view of another embodiment of an apparatus for roasting coffee beans in accordance with the principles of the present invention.

Referring now to FIG. 14 there is illustrated a schematic cross-sectional side view of a coffee roasting device, generally indicated at 800, in accordance with the principles of the present invention. The coffee roasting device 800 is comprised of a resonant chamber 802, which is defined by the inside surfaces 804 of the waveguide 806. The closed ends 808 and 810 and side walls 812 and 814 define the enclosed space of the resonant chamber 802. The resonant chamber is fine tuned based on size, load and microwave frequency to generate a standing microwave within the waveguide 806 where an anti-node of the standing microwave is precisely positioned at the heating chamber 820.

Figure 15:
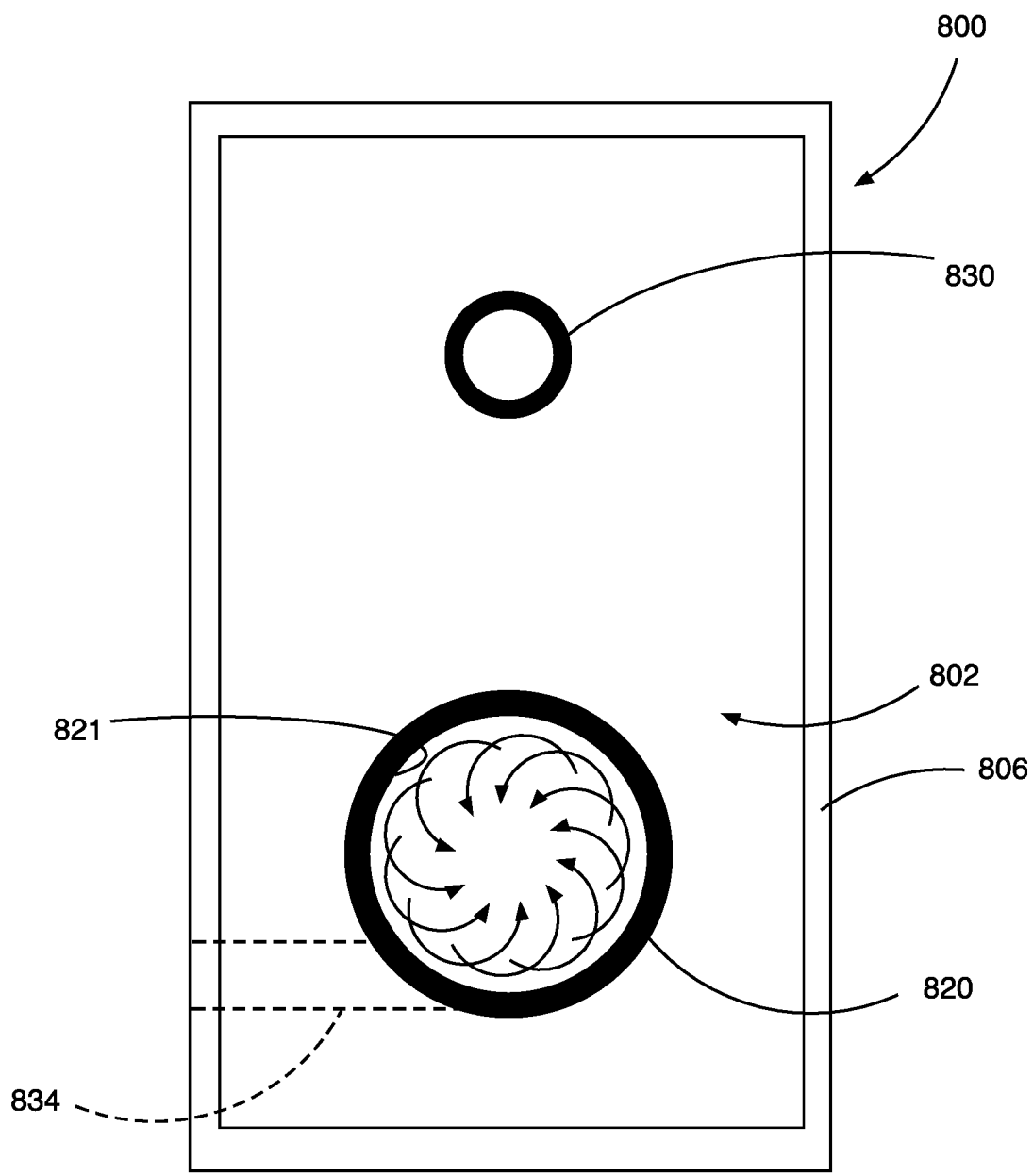
FIG. 15 is a schematic top view of the apparatus for roasting coffee beans shown in FIG. 14.

As illustrated in the top view shown in FIG. 15, the microwave is generated by the magnetron and introduced into the resonant chamber 802 of the waveguide by the magnetron antenna 830. The heating chamber 820 is positioned a distance from the magnetron antenna 830 a distance where the anti-node of the standing microwave is located within the resonant chamber 802.

In order to decrease the roasting interval and to provide a consistent roast of beans to all beans in a batch, a vortex generator 832 injects hot air into the heating chamber 820. The vortex generator 832 is positioned under and outside of the waveguide 806 and is therefore not subjected to microwaves. Thus, the vortex generator 832 need not be made out of materials that that are capable of withstanding high intensity microwave radiation. The air from the vortex generator 832 is in vortex form as it enters the heating chamber 820 through port 834 to create a vortex within the heating chamber. The air from the vortex generator 832 enters the heating chamber 820 at an angle to produce a cyclonic air flow within the heating chamber 820. The result is that the contents, which are in a particle form such as coffee beans, of the heating chamber 820 are centrifugally spun within the heating chamber 820 at a rate approximately equal to the rate of airflow into the heating chamber 820. The vortex action of the air flow causes the contents in the heating chamber 820 to move in a horizontal path around the inner surface of the heating chamber. Because the heating chamber 820 is cylindrical, the contents thus move in a circular path within the heating chamber 820. In addition, the velocity of the contents is sufficient to force the contents toward the inner wall 821 of the heating chamber 820. As a result, each coffee bean in the heating chamber 820 is exposed to substantially the same dose of microwave energy over the course of the roasting time so that each coffee bean in the heating chamber 820 is similarly roasted.

Referring again to FIG. 14, the air flowing into the heating chamber 820 from the vortex generator 832 is preheated to a temperate that is greater than 140 degrees C. up to 180 degrees C. Heating of the air decreases the overall roasting time, as compared to use of microwave energy alone, and thus assists in the roasting process. The hot air flow vortex in the vortex generator 832 translates upward through the screen 840 into the heating chamber 820. As the air moves into the heating chamber 820, the air is flowing through the heating chamber 820 in both a circular and toroidal manner. This circular and toroidal air flow causes the coffee beans in the heating chamber 820 to move in a horizontal circular path while simultaneously being tumbled along a toroidal path represented by arrows. In addition, because the air is coming up through the screen, the beans are essentially floating in the air flow. This floating action is caused by a fluidized bed of air. By floating the beans in the fluidized bed of air, the beans can freely circulate within the heating chamber 820 so that a full bean load can be accomplished. The fluidized bed and greater circulation of the beans coupled with increased air temperature dries the beans more fully and creates evenly roasted beans.

As will be shown and described in more detail, the heating chamber 820 is comprised of a tube of microwave permeable material, such as polytetrafluoroethylene (PTFE), sold under the brand name TEFLON. Being in tube form and having a wall thickness of between about 2 and 5 mm, the heating chamber 820 has sufficient structural integrity to withstand repeated insertion and removal from the resonant chamber. Also, the easy removability of the heating chamber 820 and because it is primarily constructed from PTFE, the heating chamber is easily cleanable. Also, because the heating chamber is inserted into the resonant chamber 802, the resonant chamber can be comprised of a unitary enclosed waveguide. This configuration also reduces the possibility of microwave leakage from the roaster 800. The screen 840, which is formed from metal, prevents microwave leakage through the bottom of the resonant chamber 802. Any microwave energy emanating through the top of the heating chamber is absorbed by the upper portion of the tube 842 exiting the heating chamber 802. Further, because the wave guide 806 is formed as a single enclosed space that does not need to be split for cleaning, microwave leakage is further reduced. The waveguide 806 doesn't need to be split for cleaning. This is the larges reduction. Because the waveguide ends are precisely placed and fixedly adjoined to the sides of the waveguide 806, as by a continuous weld, leakage through any joints between the ends or side walls of the waveguide 806 is prevented. Moreover, the waveguide 806 is nickel plated to remove oxidation layers from the inner surface of the waveguide 806.

Figure 16:
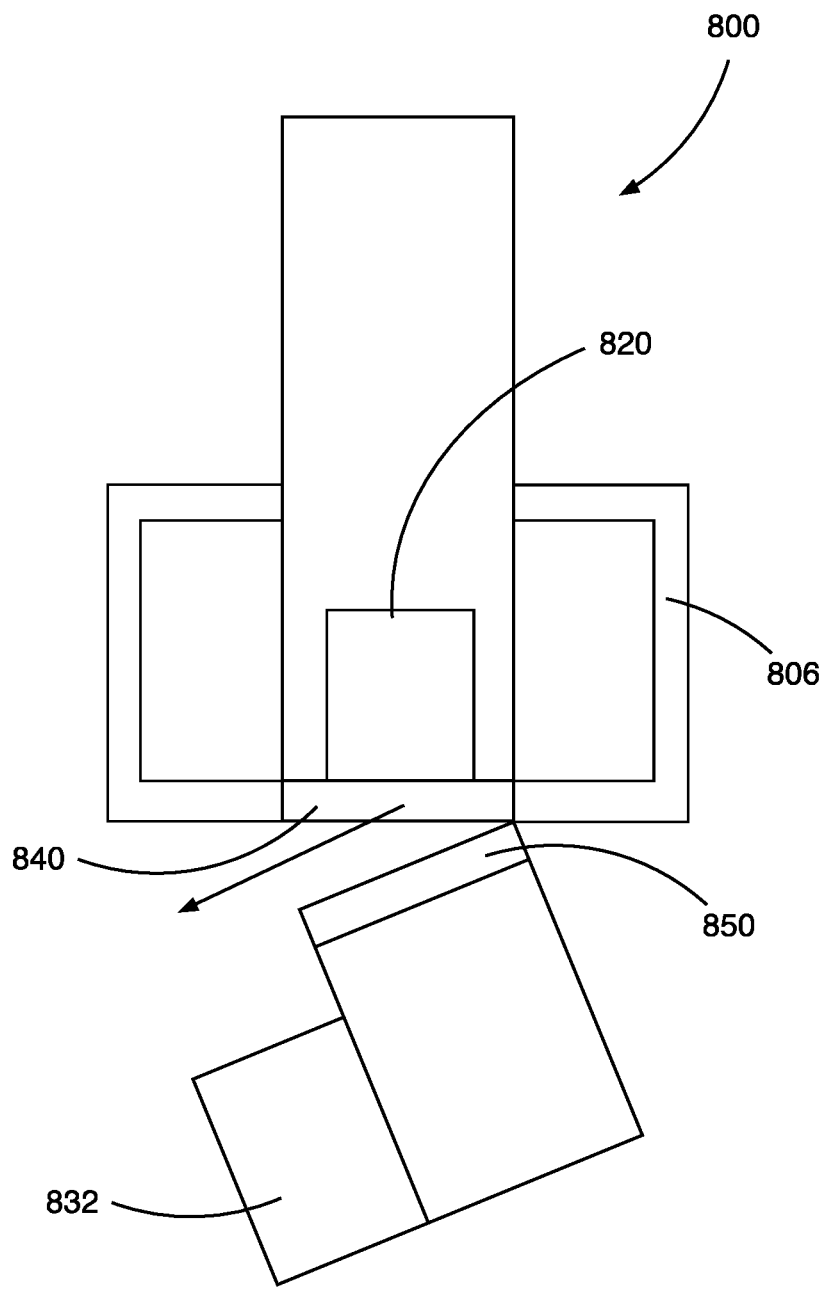
FIG. 16 is a schematic side view of the apparatus for roasting coffee beans shown in FIG. 14.

As shown in FIG. 16, the vortex generator 832 is a separate component that is removably attached to the bottom of the waveguide 806. It can be removed or titled if hingedly coupled to the waveguide 806 as shown. This allows selective access to the bottom of the heating chamber 820 and top portion of the vortex generator 832 for debris removal and/or cleaning. At the top of the vortex generator 832, a screen 850 is coupled to the vortex generator 832. This screen 850 is in addition to the screen 840 provided on the bottom of the heating chamber 820. By opening the bottom of the heating chamber 820, any residual particles that may have been able to pass through the screen 840 of the heating chamber 820 can be easily removed.

Figure 17:
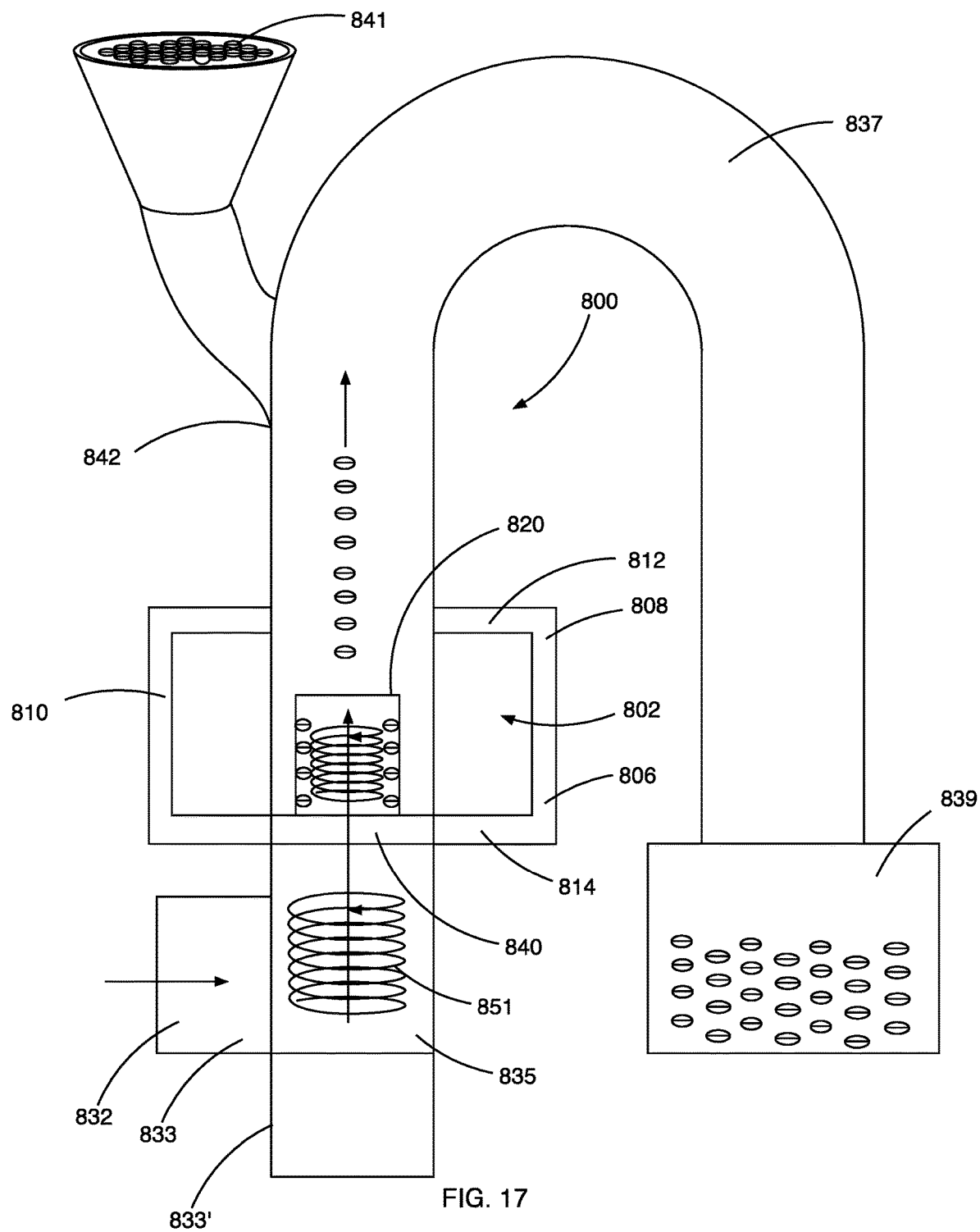
FIG. 17 is a schematic side view of the apparatus for roasting coffee beans shown in FIG. 14 that includes coffee bean insertion and extraction systems.

Alternatively, as shown in FIG. 17, the vortex generator 832 is capable of producing a vortex of air 851 that travels up from the vortex generator 832 and into and through the heating chamber 820 to circulate the coffee beans contained therein. The vortex generator 832 is comprised of a blower 833 that sends air into a cylindrical vortex chamber 835 at an angle to cause the air to circulate in a circular pattern to form the vortex of air 851. This cyclonic flow of air 851 continues up into the heating chamber 820 causing the coffee beans contained therein to move in a circular manner within the cylindrically shaped heating chamber 820. When the roasting process of the coffee beans is completed, the air flow produced by the blower 833 can be increased to an amount sufficient to cause the roasted coffee beans to flow up and out of the heating chamber as shown by the arrow and through a collection tube 837 into a collection container 839. When the roasted coffee beans are being extracted from the heating chamber 820, the vortex air flow 851 can be switched off so that the flow of air is primarily directed vertically through the heating chamber 820 to blow the coffee beans through the collection tube 837. With such a system, the process can be automated so that unroasted coffee beans 841 are funneled into the heating chamber 820 in batches to be roasted during a single roasting cycle. After the beans have been roasted, they are expelled from the heating chamber 820 by an increased vertical flow of air through the heating chamber 820 that causes the coffee beans to be transported in the flow of air into the collection container 839. This can be accomplished in a number of ways, including increasing the vortex air flow, changing the vortex air flow to a vertical air flow via a geometry change in the vortex generator or providing a secondary blower 833' that creates a vertical flow of air through the heating chamber 820.

Figure 18:
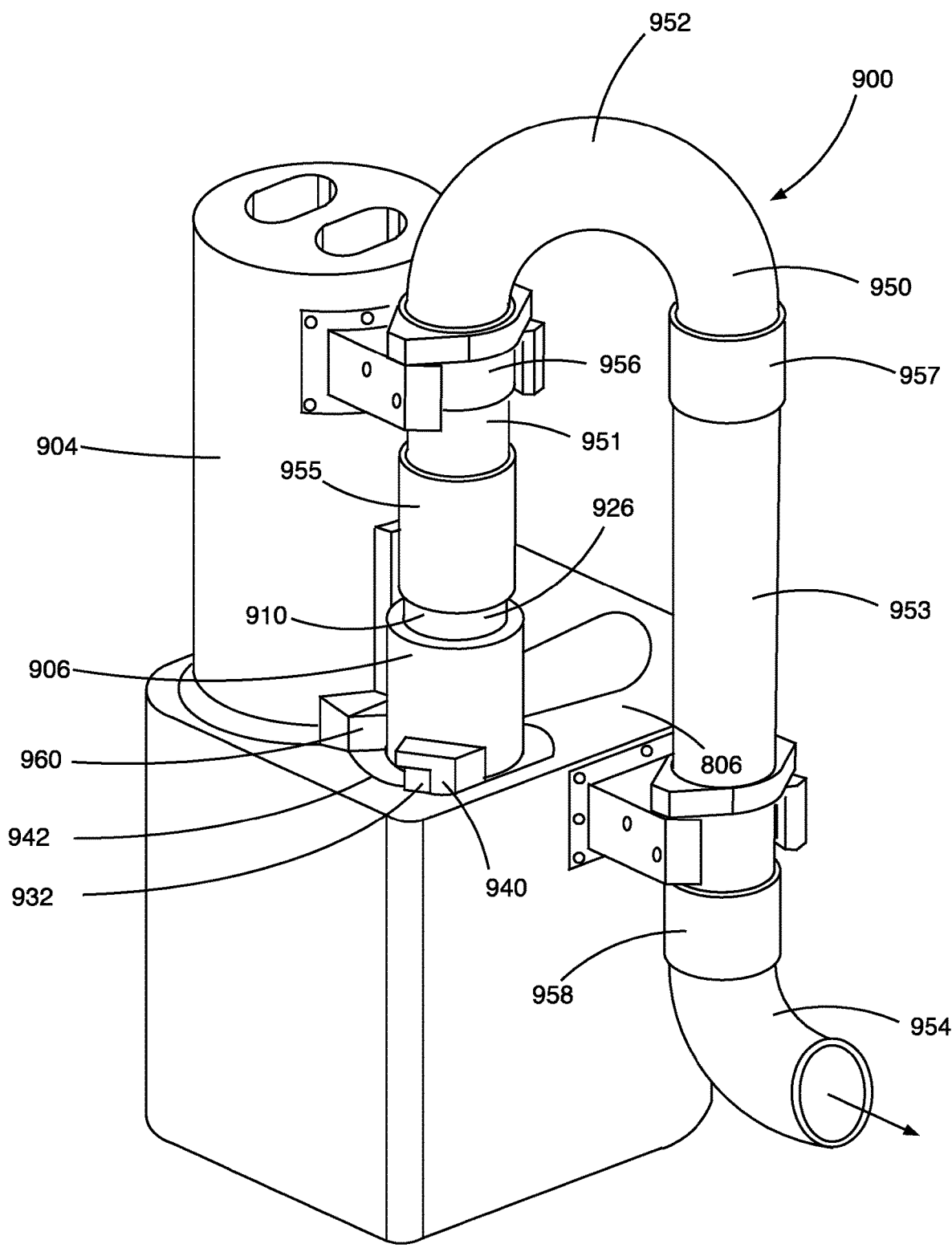
FIG. 18 is a perspective side view of yet another embodiment of an apparatus for roasting coffee beans in accordance with the principles of the present invention.

FIG. 18 illustrates a coffee roasting device, generally indicated at 900, in accordance with the present invention. The coffee roasting device 900 is comprised of an outer housing 902 within which is housed a magnetron, microwave antenna and waveguide arranged in accordance with the teachings of the present invention. A vortex generator 904 is coupled to the top of the housing 902 and is in fluid communication with the heating chamber device 906. The outer housing 902 that may be made of metal or plastic. If formed from plastic, the outer housing 902 is coated with an RF conductive paint thereby forming a conductive enclosure that surrounds the components of the system 900 that are exposed to or that generate microwave radiation. The RF conductive paint thus absorbs and stray microwave radiation that may leak from the system.

Figure 19:
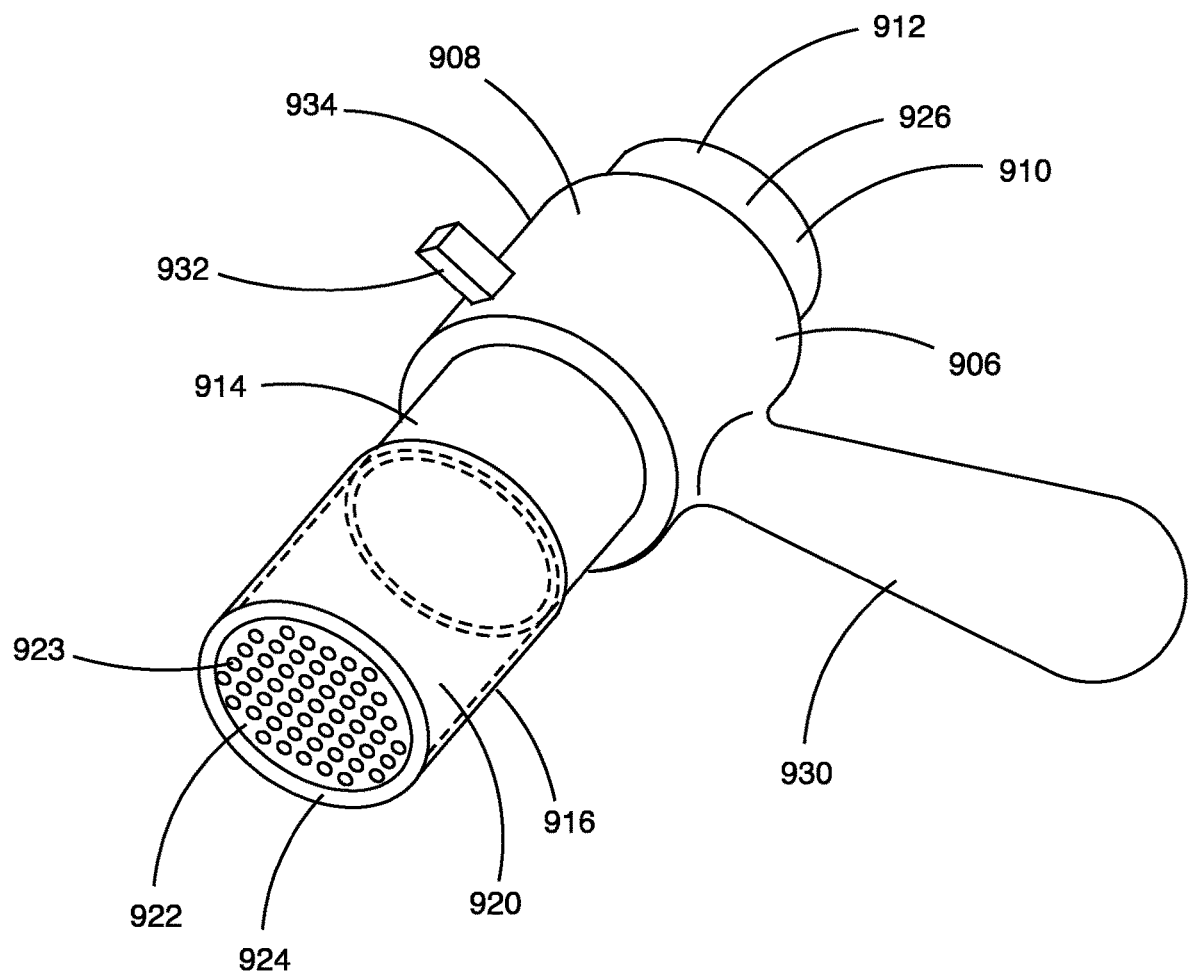
FIG. 19 is a perspective side view of the roasting chamber device of FIG. 18 in accordance with the principles of the present invention.

As shown in FIG. 19, the heating chamber device 906 is comprised of a sleeve 908 that is coupled to a tube 910. The tube 910 extends through the sleeve 908 and includes exposed ends 912 and 914 on both sides of the sleeve 906. Attached to the distal end 914 of the tube 910 is a cylindrical tube 916 formed of microwave permeable material, such as PTFE. The tube 916 forms the heating chamber 920 of the system. A screen 922, formed of microwave absorbing material such as metal, is attached to the distal end 924 of the heating chamber 920. The screen 922 is perforated with a plurality of holes 923 that are small enough to prevent coffee beans from falling through the holes 923, but large enough to allow air from the vortex generator to flow through the screen 922. The tubes 910 and 916 form an elongate cylindrical channel that extends from the screen 922 to the proximal end 926 of the tube 910.

The sleeve 906 is provided with a radially and laterally extending handle 930 that depends from the outer surface 934 of the sleeve 906 and may be integrally formed therewith. The sleeve is also provided with one or more protrusions 932 that radially and laterally extend from the outer surface 934 of the sleeve. Referring again to FIG. 17, the protrusion 932 engages with an L-shaped retaining bracket 940 that extends from the top surface 942 of the housing 902. Engagement of the protrusion 932 with the L-shaped retaining bracket 940 forms a locking mechanism that selectively locks the heating chamber device 906 to the housing 902 and properly positions the heating chamber 916 within the waveguide. While not visible, the heating chamber device 906 may include a second radially and laterally extending protrusion on an opposite side from the protrusion 932 and a second L-shaped retaining bracket 940 may be provided opposite the L-shaped retaining bracket 940 for engagement with the second protrusion. To remove the heating chamber device 906 from the housing 902, the handle is rotated in a counter-clockwise direction until the protrusion 932 disengages from the L-shaped bracket 940. The tubes 910 and 916 can then be lifted from the housing 902 to remove the heating chamber device 906 for cleaning and refill of coffee beans for another roasting operation.

The proximal end 926 of the tube 910 is coupled to an exit tube 950. The exit tube 950 may be comprised of one or more sections 951-954 coupled together with a plurality of couplings 955-958. The exit tube 950 receives the flow of air from the heating chamber device 906, which during the roasting process will contain smoke and other airborne particulates. The exit tube 950 can therefore be coupled to an exhaust system and/or particulate removal system (neither of which is shown).

In order to ensure safe operation of the coffee roasting device 900, various safety switches are linked in series to make sure that all of the components are properly installed before the magnetron can be activated. This includes a switch 960 that ensures that the heating chamber device 906 is properly coupled to the housing 902 and that the protrusion 932 is fully engaged into the bracket 940. In addition, the magnetron includes an over temperature switch to ensure that overheating of the magnetron does not occur. Other switches and sensors may be provided to ensure that the system can only be safely operated.

The devices of the present invention may also be configured with a portable power supply, such as a battery, solar power generator, or hookup for an automobile battery. The portable device may include, for example, a customer interface operably connected to the electronics system that communicates with a payment source where funds are located for payment of the product resulting from the device.

Thus, there are disclosed new apparatuses and methods for roasting coffee. It will be appreciated that numerous modifications may be made without departing from the scope and spirit of the invention. The appended claims cover such modifications to the devices and methods claimed below. In the foregoing specification, the present invention has been described with reference to specific exemplary embodiments. Various modifications and changes may be made, however, without departing from the spirit and scope of the present invention as set forth in the claims. The specification and figures are illustrative, not restrictive, and modifications are intended to be included within the scope of the present invention. Accordingly, the scope of the present invention should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages, and solutions to problems have been described above with regard to particular embodiments. Any benefit, advantage, solution to problem, or any element that may cause any particular benefit, advantage, or solution to occur or to become more pronounced are not to be construed as critical, required, or essential features or components of any or all the claims.

The terms "comprise", "comprises", "comprising", "having", "including", "includes" or any variations of such terms, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials, or components used in the practice of the present invention, in addition to those not specifically recited, may be varied or otherwise particularly adapted to specific environments, manufacturing specifications, design parameters, or other operating requirements without departing from the general principles of the same.

What is claimed is:

1. An apparatus for roasting coffee beans, comprising:
a roasting chamber device for containing coffee beans, the roasting chamber device comprising an elongate microwave permeable tube and a screen attached to a distal end of the microwave permeable tube;
a microwave emitter configured to produce microwave energy within the roasting chamber and heat the coffee beans to a temperature sufficient to roast the coffee beans;
a waveguide defining a resonant cavity configured to generate a field of microwave energy comprising one or more stable high intensity microwave regions, the roasting chamber positioned at least partially within the wave guide at a location of the one or more stable high intensity microwave regions, wherein the one or more stable high intensity microwave regions includes a microwave energy maxima located at least partially within the roasting chamber; and
a vortex generator in fluid communication with the distal end of the microwave permeable tube of the roasting chamber device, the vortex generator positioned outside the waveguide and generating a flow of air in vortex form into the waveguide and through the microwave permeable tube to circulate the coffee beans within microwave permeable tube while being exposed to the one or more high intensity microwave regions within the waveguide.

2. The apparatus of claim 1, wherein the roasting chamber device further comprises a second tube extending from the microwave permeable tube and a handle coupled to the second tube, at least a portion of the second tube extending out of the waveguide and the handle being exposed for grasping the roasting chamber device.

3. The apparatus of claim 2, wherein the second tube is comprised of metal.

4. The apparatus of claim 2, wherein the second tube is selectively removable from the from the waveguide for emptying coffee beans from the second tube or for cleaning the second tube.

5. The apparatus of claim 1, wherein the roasting chamber device further comprises at least one laterally extending protrusion configured for coupling with a retaining member coupled to the waveguide to secure the roasting chamber device to the waveguide during a bean roasting process.

6. The apparatus of claim 1, wherein the vortex generator comprises a blower in fluid communication with the roasting chamber for directing a flow of air in vortex form through the roasting chamber during roasting of the coffee beans to move the coffee beans in a generally circular path within the roasting chamber.

7. The apparatus of claim 6, wherein the screen defines one or more apertures that are sized to prevent coffee beans from passing through the one or more apertures, the flow of air from the vortex generator passing through the one or more apertures.

8. The apparatus of claim 6, further comprising a heating element in fluid communication with the flow of air to heat the air entering the roasting chamber.

9. The apparatus of claim 1, wherein the air is heated from between about 140 degrees C. to 180 degrees C.

10. The apparatus of claim 1, wherein the elongate microwave permeable tube is cylindrical.

11. The apparatus of claim 1, wherein the vortex generator generates a toroidal flow of air within the elongate microwave permeable tube to circulate the coffee beans in a toroidal path within the elongate microwave permeable tube.

12. The apparatus of claim 1, wherein the elongate microwave permeable tube is comprised of polytetrafluoroethylene.

13. The apparatus of claim 1, wherein the waveguide comprises a rectangular tube formed by a top wall, a bottom wall, first and second side walls and first and second end walls, where an inside surface of the first end wall and an inside surface of the second end wall is spaced to produce a standing wave within the wave guide with a single microwave antinode located within the roasting chamber.

14. The apparatus of claim 13, wherein the inner surfaces of the waveguide are nickel plated and the top wall, bottom wall, first and second side walls and first and second end walls are joined together by continuous welds along their respective joints.

15. The apparatus of claim 1, wherein the waveguide defines an aperture in a top wall thereof and wherein the roasting chamber device extends through the aperture and into the resonant cavity.

16. The apparatus of claim 1, wherein the field of microwave energy is sufficiently strong to roast the coffee beans to a first crack or a second crack in less than one minute.

17. The apparatus of claim 1, further comprising a coffee bean insertion system for adding coffee beans in batches to the roasting chamber.

18. The apparatus of claim 1, further comprising a coffee bean extraction system for removing roasted coffee beans from the roasting chamber.

19. The apparatus of claim 18, wherein the coffee bean extraction system comprises a vertical flow of air through the heating chamber sufficient to remove roasted coffee beans from the heating chamber.

20. The apparatus of claim 1, wherein the vortex generator is selectively separable from the waveguide to allow access between the vortex generator and the waveguide.

* * * * *